(12) United States Patent
Hirakawa

(10) Patent No.: US 12,743,640 B2
(45) Date of Patent: Sep. 22, 2026

(54) INCONSISTENCY DETECTION DEVICE, INCONSISTENCY DETECTION METHOD, AND COMPUTER-READABLE RECORDING MEDIUM

(71) Applicant: NEC Corporation, Tokyo (JP)

(72) Inventor: Shiho Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 822 days.

(21) Appl. No.: 18/012,180

(22) PCT Filed: Jun. 25, 2020

(86) PCT No.: PCT/JP2020/025036
§ 371 (c)(1),
(2) Date: Dec. 21, 2022

(87) PCT Pub. No.: WO2021/260885
PCT Pub. Date: Dec. 30, 2021

(65) Prior Publication Data

US 2023/0306287 A1 Sep. 28, 2023

(51) Int. Cl.
*G06N 5/04* (2023.01)
*G06N 5/022* (2023.01)

(52) U.S. Cl.
CPC ............. *G06N 5/041* (2013.01); *G06N 5/022* (2013.01)

(58) Field of Classification Search
CPC ............................... G06N 5/041; G06N 5/022
See application file for complete search history.

(56) References Cited

U.S. PATENT DOCUMENTS 5,493,504 A * 2/1996 Minato .................... G06F 30/30 716/136
8,359,583 B2 * 1/2013 Chou .................. G06F 11/3612 716/106

(Continued)

FOREIGN PATENT DOCUMENTS

JP H06-195220 A 7/1994
JP 2000-242499 A 9/2000

(Continued)

OTHER PUBLICATIONS

"Using BDDs with Combinations of Theories", Fontaine et al. (Year: 2002).*

(Continued)

*Primary Examiner* — David Yi
*Assistant Examiner* — Andrew Bracero
(74) *Attorney, Agent, or Firm* — Sughrue Mion, PLLC

(57) ABSTRACT

The acceptance means 81 accepts input of a series of observed events. The deletion means 82 deletes, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the accepted observed event. The determination means 83 determines whether or not a path from a root node to a true-valued leaf node exists in the decision graph after the deletion of the edge. The decision means 84 decides that the series of observed events is inconsistent with respect to the knowledge base when being determined that there is no path to the leaf node indicating the true value.

6 Claims, 23 Drawing Sheets

(56) References Cited

U.S. PATENT DOCUMENTS

2007/0174804 A1* 7/2007 Sasao .................... G06F 30/34
716/105
2020/0242150 A1* 7/2020 Abdelwahab ........... G06N 5/01

FOREIGN PATENT DOCUMENTS

JP 2013-008221 A 1/2013
JP 2015-502620 A 1/2015
WO WO-0013113 A1 * 3/2000 ............... G06N 5/01
WO WO-2020044415 A1 * 3/2020 ............. G06N 5/041

OTHER PUBLICATIONS

International Search Report for PCT Application No. PCT/JP2020/025036, mailed on Sep. 29, 2020.

* cited by examiner

FIG. 10

| OBSERVED EVENT | PATH NUMBER |
|---|---|
| ¬S | (1),(5) |
| ¬U | (2),(4),(6) |
| P | (5),(6) |
| Q | (3),(4) |

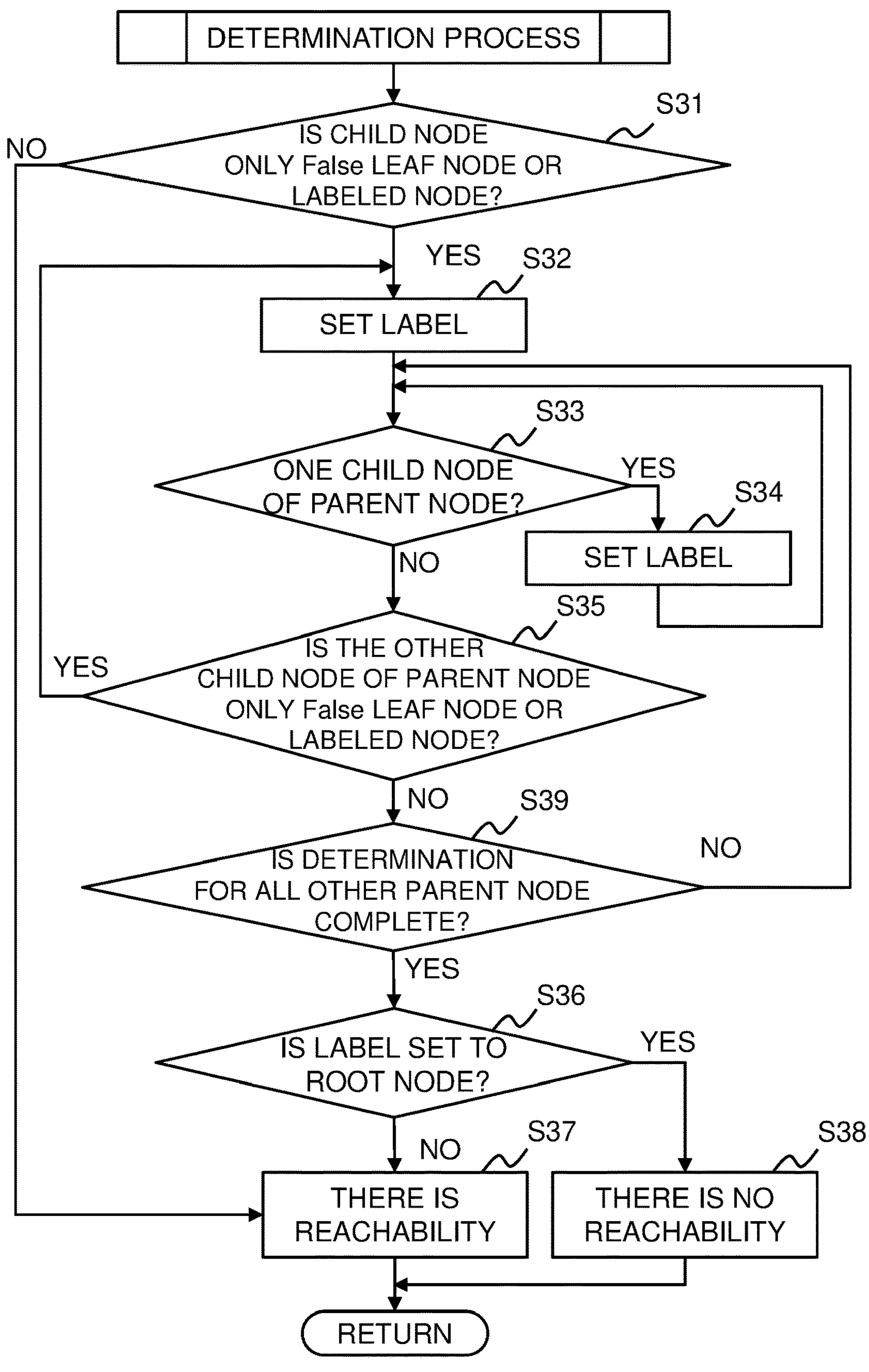
FIG. 16
DETERMINATION PROCESS
S31
IS CHILD NODE ONLY False LEAF NODE OR LABELED NODE?
NO
YES
S32
SET LABEL
S33
ONE CHILD NODE OF PARENT NODE?
YES
S34
SET LABEL
NO
S35
IS THE OTHER CHILD NODE OF PARENT NODE ONLY False LEAF NODE OR LABELED NODE?
YES
NO
S39
IS DETERMINATION FOR ALL OTHER PARENT NODE COMPLETE?
NO
YES
S36
IS LABEL SET TO ROOT NODE?
YES
NO
S37
THERE IS REACHABILITY
S38
THERE IS NO REACHABILITY
RETURN

INCONSISTENCY DETECTION DEVICE, INCONSISTENCY DETECTION METHOD, AND COMPUTER-READABLE RECORDING MEDIUM

This application is a National Stage Entry of PCT/JP2020/025036 filed on Jun. 25, 2020, the contents of all of which are incorporated herein by reference, in their entirety.

TECHNICAL FIELD

The present invention relates to an inconsistency detection device and an inconsistency method for detecting inconsistencies in deriving a hypothesis by applying reasoning knowledge to observed events, and further to a computer-readable recording medium containing a program for realizing these device and method.

BACKGROUND ART

A type of logical reasoning is known as hypothetical reasoning. The hypothetical reasoning is a method to derive the best hypothesis from given knowledge (rules) and observed events (obtained facts). For example, if "A⇒B (if A is true, then B is true)" exists as knowledge and "B (B is true))" as an observed event. In this case, "A (A is true)" is obtained as a hypothesis by hypothetical reasoning.

Attempts have been made to perform this hypothetical reasoning by computer (see, for example, Patent Literature 1). If hypothetical reasoning is performed by a computer, it is possible to infer various situations based on information obtained from facts. Therefore, hypothetical reasoning by computers is useful for planning store openings, criminal investigations, evacuation during disasters, environmental management, etc., and the use of hypothetical reasoning is expected to improve the accuracy of simulations.

CITATION LIST

Non Patent Literature

PTL 1: Japanese Patent Laid-Open No. 2000-242499

SUMMARY OF INVENTION

Technical Problem

On the other hand, the Patent Literature 1 does not assume the case where observed events are inconsistent with knowledge. Therefore, in hypothetical reasoning, if observed events are inconsistent with knowledge, correct hypotheses cannot be derived. In such a case, there is a risk of wasting time and deriving incorrect reasoning results by performing useless reasoning. Therefore, it is desirable to be able to detect inconsistencies of observed events with respect to the knowledge base when deriving hypotheses.

Therefore, it is an exemplary object of the present invention to provide an inconsistency detection device, an inconsistency detection method, and a computer-readable recording medium capable of detecting inconsistencies of observed events with respect to a knowledge base.

Solution to Problem

In order to achieve the above-mentioned purpose, an inconsistency detection device in one aspect of the present invention includes: an acceptance means which accepts input of a series of observed events including one or more observed events; a deletion means which deletes, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the observed event accepted by the acceptance means; a determination means which determines whether or not a path from a root node to a true-valued leaf node exists in the decision graph after the deletion of the edge by the deletion means; and a decision means which decides that the series of observed events is inconsistent with respect to the knowledge base when the determining means determines that there is no path to the true-valued leaf node.

In addition, in order to achieve the above-mentioned purpose, an inconsistency detection method in one aspect of the present invention includes: accepting input of a series of observed events including one or more observed events; deleting, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the accepted observed event; determining whether or not a path from a root node to a true-valued leaf node exists, in the decision graph after the deletion of the edge; and deciding that the series of observed events is inconsistent with respect to the knowledge base when determined that there is no path to the true-valued leaf node.

Further, in order to achieve the above-mentioned purpose, a computer-readable recording medium stores an inconsistency detection program causes a computer to execute: acceptance process of accepting input of a series of observed events including one or more observed events; deletion process of deleting, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the accepted observed event; determination process of determining whether or not a path from a root node to a true-valued leaf node exists, in the decision graph after the deletion of the edge; and decision process of deciding that the series of observed events is inconsistent with respect to the knowledge base when determined that there is no path to the true-valued leaf node.

Advantageous Effects of Invention

According to the present invention, inconsistencies of observed events with respect to a knowledge base can be detected.

BRIEF DESCRIPTION OF DRAWINGS

FIG. 10 It depicts an explanatory diagram showing a list of paths to be blocked for observed events.

FIG. 16 It depicts a flowchart showing an example of a determination process regarding reachability.

DESCRIPTION OF EMBODIMENTS

The inconsistency detection device, the inconsistency detection method, and computer-readable recording medium in the exemplary embodiment of the present invention will be described with reference to the drawings.

Exemplary Embodiment 1

[Device Configuration]

Figure 1:
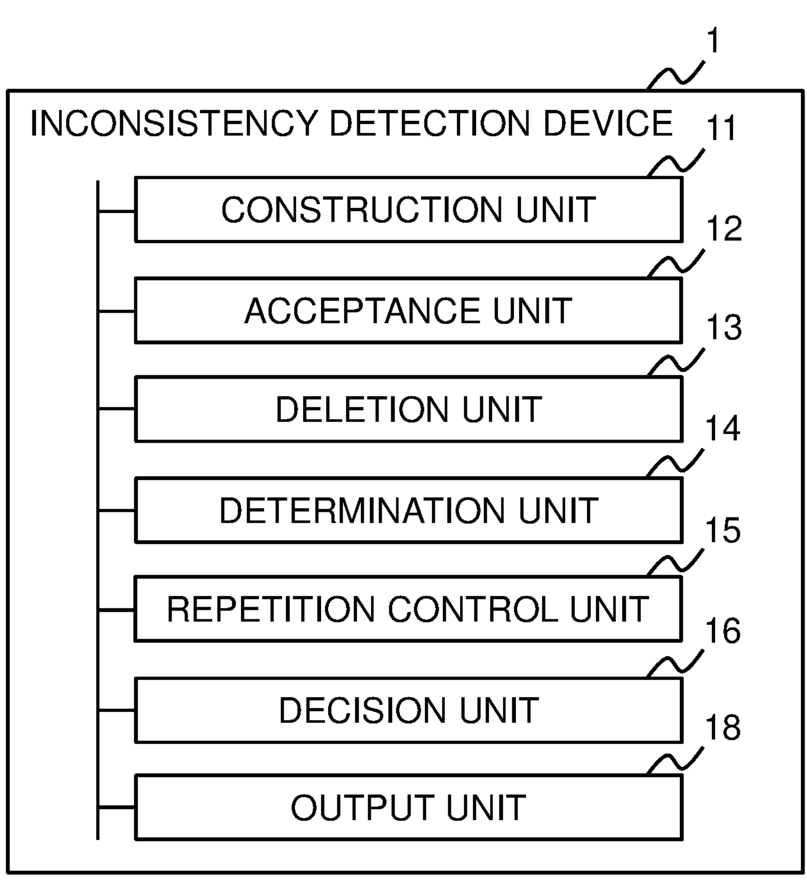
FIG. 1 It depicts a block diagram showing a configuration example of a first exemplary embodiment of an inconsistency detection device according to the present invention.

FIG. 1 is a block diagram showing a configuration example of a first exemplary embodiment of an inconsistency detection device according to the present invention. The inconsistency detection device according to the present invention is a device that detects whether an event which is observed (hereinafter referred to as "observed event") is inconsistent with the knowledge base. The inconsistency detection device 1 in this exemplary embodiment includes a construction unit 11, an acceptance unit 12, a deletion unit 13, a determination unit 14, a repetition control unit 15, a decision unit 16, and an output unit 18.

The construction unit 11 constructs a decision graph based on the knowledge base, where the observed events are nodes and a transition relationship between each of the observed events are edges, and where the boolean values of the observed events are output based on the knowledge base. Specifically, a leaf node of the decision graph is the node that indicates a boolean value.

The knowledge base is data for performing hypothetical reasoning. The knowledge base is stored in an unshown storage device. The storage device may be external to the inconsistency detection device 1 or may be provided by the inconsistency detection device 1.

The knowledge base is represented, for example, by an implication relation rule of a first-order predicate logic formula. The knowledge base is expressed, for example, in the form "pre-state (premise)⇒post-state (consequence)". This form indicates that if the pre-state, which is the premise to be observed, is true, then the post-state, which is the inevitable consequence, is derived. In this form, the "post-state" is a necessary condition for the "pre-state" to be true. The "pre-state" is a sufficient condition for the "post-state" to hold. The sufficient condition can also be expressed as a conjunction of multiple propositions. The knowledge base may be expressed, for example, as "pre-state (premise)∧action⇒post-state".

The observed event is represented, for example, by a first-order predicate logic formula. Multiple observed events may be given, and when multiple observed events are given, the set of observed events is called a series of observed events. If only a false value (sometimes referred to as False) is derived from the knowledge base and the series of observed events, then it is considered to be inconsistent. In other words, the decision graph represented by the knowledge base and the series of observed events is inconsistent if there is no path from a root node to a true-valued leaf node.

The construction unit 11 may, for example, construct a ZDD (Zero-suppressed Binary Decision Diagram) as a decision graph by representing the results of case classification of the values of logical expressions for all variables based on the knowledge base as a binary decision tree and then contracting it.

Figure 2:
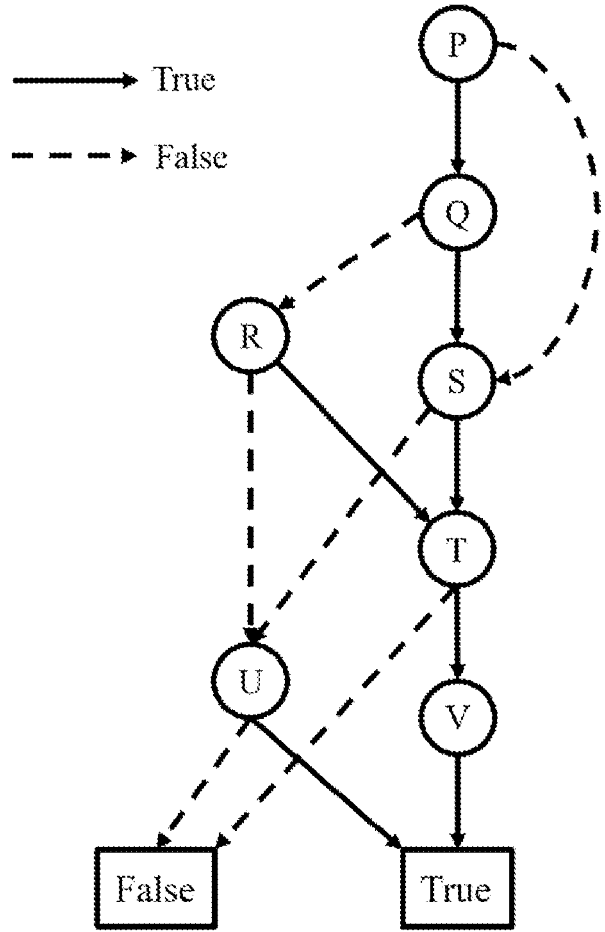
FIG. 2 It depicts an explanatory diagram showing an example of a decision graph.

FIG. 2 is an explanatory diagram showing an example of a decision graph constructed by the construction unit 11. The decision graph illustrated in FIG. 2 is a ZDD representing a knowledge base. This decision graph consists of nodes and edges. Each node is an observed event. Each edge connects a node to a node and represents the transition relationship of each node. In the example shown in FIG. 2, the edge in the direction of transition when the node is true (hereinafter referred to as the "True" edge) is indicated by a solid arrow, and the edge in the direction of transition when the node is false (hereinafter referred to as the "False" edge) is indicated by a dashed arrow.

In the decision graph illustrated in FIG. 2, the root node is a node that has no parent node and is node "P". Also, a leaf node is a node that has no child nodes, and in the example shown in FIG. 2, they are the nodes "True" and "False".

From this decision graph, the boolean value of the observed event, i.e., "True" or "False", is derived.

From the nature of the ZDD, "False" edge connected to node "P" contains "¬Q" and "¬R", and "True" edge connected to node "Q" contains "¬R". Similarly, "True" edge and "False" edge connected to node "R" contain "¬S", and "False" edge connected to node "S" contains "¬T". Moreover, "True" edge contains "¬U" and "False" edge contains "U" and "¬V" which are connected to node "T", and "True" edge connected to node "U" contains "¬V". Note that the construction unit 11 may construct a SDD (Sentential Decision Diagram) as a decision graph.

The acceptance unit 12 accepts observed events. Specifically, the acceptance unit 12 accepts a series of observed events including one or more observed events.

Figure 3:
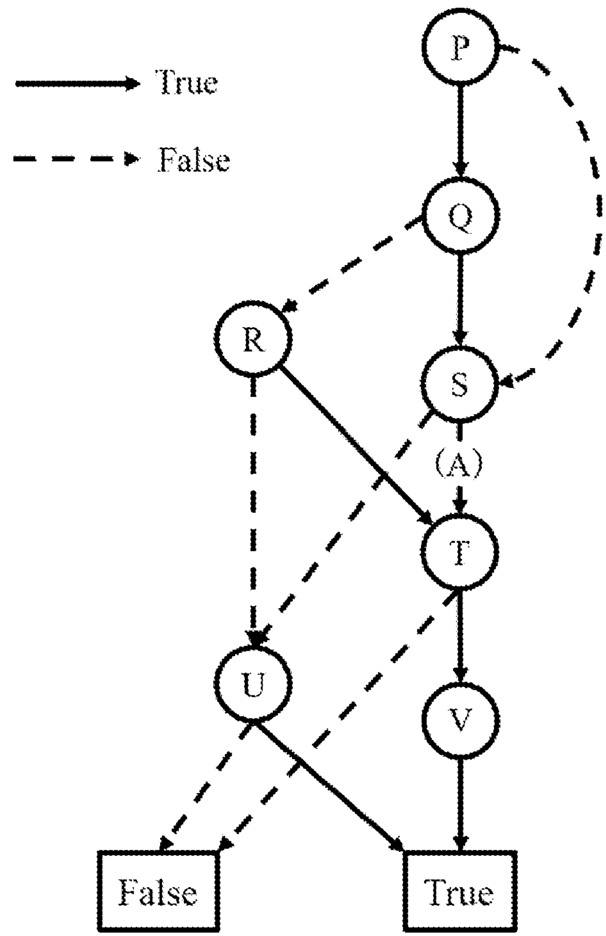
FIG. 3 It depicts an explanatory diagram showing an example of the process of deleting edges.

The deletion unit 13 deletes edges in the decision graph that are connected to the node corresponding to the observed event accepted by the acceptance unit 12 and that indicate a transition to a negation side of the observed event. FIG. 3 is an explanatory diagram showing an example of the process of deleting edges. In the decision graph illustrated in FIG. 2, an edge that indicates a transition to a negation side of the observed event means, for example, when the observed event is "¬S, "True" edge (edge (A) illustrated in FIG. 3) connected to node "S".

The determination unit 14 determines whether or not a path from a root node to a true-valued leaf node exists in the decision graph after the deletion of the edge by the deletion unit 13. Specifically, the determination unit 14 determines the reachability of the "True" leaf node in the decision graph after the deletion of the edge by the deletion unit 13.

The reachability is the presence or absence of a path from the root node to the "True" leaf node (Hereafter, simply referred to the path to "True.") If the path to "True" exists, the determination unit 14 determines that it is reachable. On the other hand, if the path to "True" does not exist, the determination unit 14 determines that it is not reachable. In the decision graph illustrated in FIG. 3, even if the edge in (A) is deleted, the path to "True" still exists. Therefore, the determination unit 14 determines that the decision graph illustrated in FIG. 3 is reachable.

Figure 4:
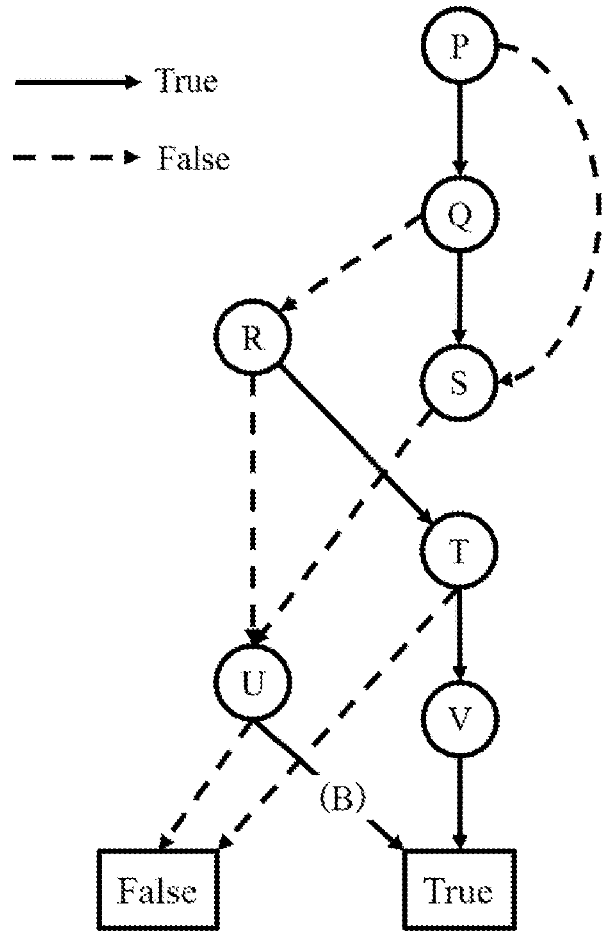
FIG. 4 It depicts an explanatory diagram showing another example of the process of deleting edges.
Figure 5:
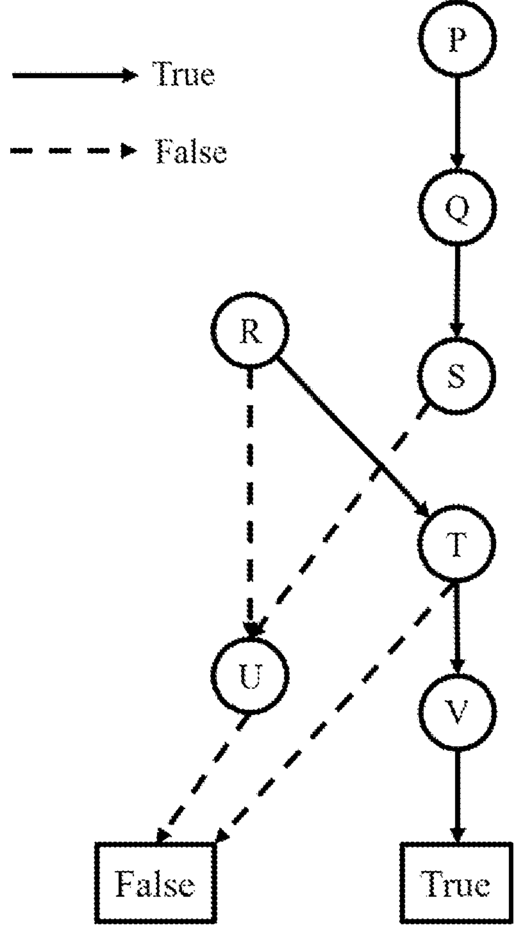
FIG. 5 It depicts an explanatory diagram showing another example of the process of deleting edges.

The repetition control unit 15 controls the acceptance unit 12, the deletion unit 13, and the determination unit 14 to repeat the above process when the determination unit 14 determines that a path to "True" exists. FIG. 4 and FIG. 5 are explanatory diagrams showing other examples of the process of deleting edges. Hereinafter, it is assumed that the acceptance unit 12 accepts the inputs of observed events "¬U", "P", and "Q" in order.

First, the acceptance unit 12 accepts the input of the next observed event, "¬U". The deletion unit 13 deletes the "True" edge connected to node "U" (edge (B) illustrated in FIG. 4). The determination unit 14 determines reachability in the decision graph after edge deletion by the deletion unit 13.

At this stage, a path to "True" exists. Therefore, the acceptance unit 12 accepts the input of the next observed event, "P". Even though the edge of "False" connected to node "P" is deleted, the path to "True" exists. Therefore, the acceptance unit 12 accepts the input of the next observed event, "Q". The decision graph illustrated in FIG. 5 shows the decision graph after the deletion of the "False" edge connected to node "Q".

In the decision graph illustrated in FIG. 5, there is no path from the root node to the "True" leaf node. In other words, the determination unit 14 determines that there is no possibility of reaching it. This means that the decision graph shown in FIG. 5 always outputs "False" no matter what events are observed thereafter.

The method by which the determination unit 14 determines whether a path to "True" exists or not is arbitrary. For example, the determination unit 14 may determine whether or not a path to "True" exists by searching the edges from the root node to the leaf node in a diallel method.

The decision unit 16 decides that the series of observed events is inconsistent with respect to the knowledge base when the determination unit 14 determines that there is no path to the true-valued leaf node. For example, in the examples shown in FIGS. 2 through 4, the decision unit 16 decides that a series of observed events ("¬S", "¬U", "P", and "Q") are decided to be inconsistent with respect to the knowledge base.

The output unit 18 outputs the series of observed events decided to be inconsistent by the decision unit 16 (specifically, the observed events that are accepted by the acceptance unit 12 before the inconsistency is detected). The output unit 18 may, for example, sequentially output the process by which edges of the decision graph are deleted based on the series of observed events.

The construction unit 11, the acceptance unit 12, the deletion unit 13, the determination unit 14, the repetition control unit 15, the decision unit 16, and the output unit 18 are realized by a computer processor (for example, CPU (Central Processing Unit), GPU (Graphics Processing Unit) operating according to the program (inconsistency detection program).

For example, a program may be stored in the storage unit (not shown) of the inconsistency detection device 1, and the processor may read the program and, according to the program, operate the construction unit 11, the acceptance unit 12, the deletion unit 13, the determination unit 14, the repetition control unit 15, the decision unit 16, and the output unit 18. In addition, the functions of the construction unit 11, the acceptance unit 12, the deletion unit 13, the determination unit 14, the repetition control unit 15, the decision unit 16, and the output unit 18 may be provided in Saas (Software as a Service) format.

The construction unit 11, the acceptance unit 12, the deletion unit 13, the determination unit 14, the repetition control unit 15, the decision unit 16, and the output unit 18 may each be realized by dedicated hardware. In addition, some or all of the components of each device may be realized by a general-purpose circuit (circuitry) or a dedicated circuit, a processor, etc., or a combination of these. They may be configured by a single chip or by multiple chips connected via a bus. Some or all of the components of each device may be realized by a combination of the above-mentioned circuits, etc. and programs.

In the case where some or all of the components of the construction unit 11, the acceptance unit 12, the deletion unit 13, the determination unit 14, the repetition control unit 15, the decision unit 16, and the output unit 18 are realized by a plurality of information processing devices, circuits, or the like, the plurality of information processing devices, circuits, or the like may be centrally located or distributed. For example, the information processing devices, circuits, etc. may be realized as an embodiment where each of which is connected via a communication network, such as a client-server system, a cloud computing system, etc.

Figure 6:
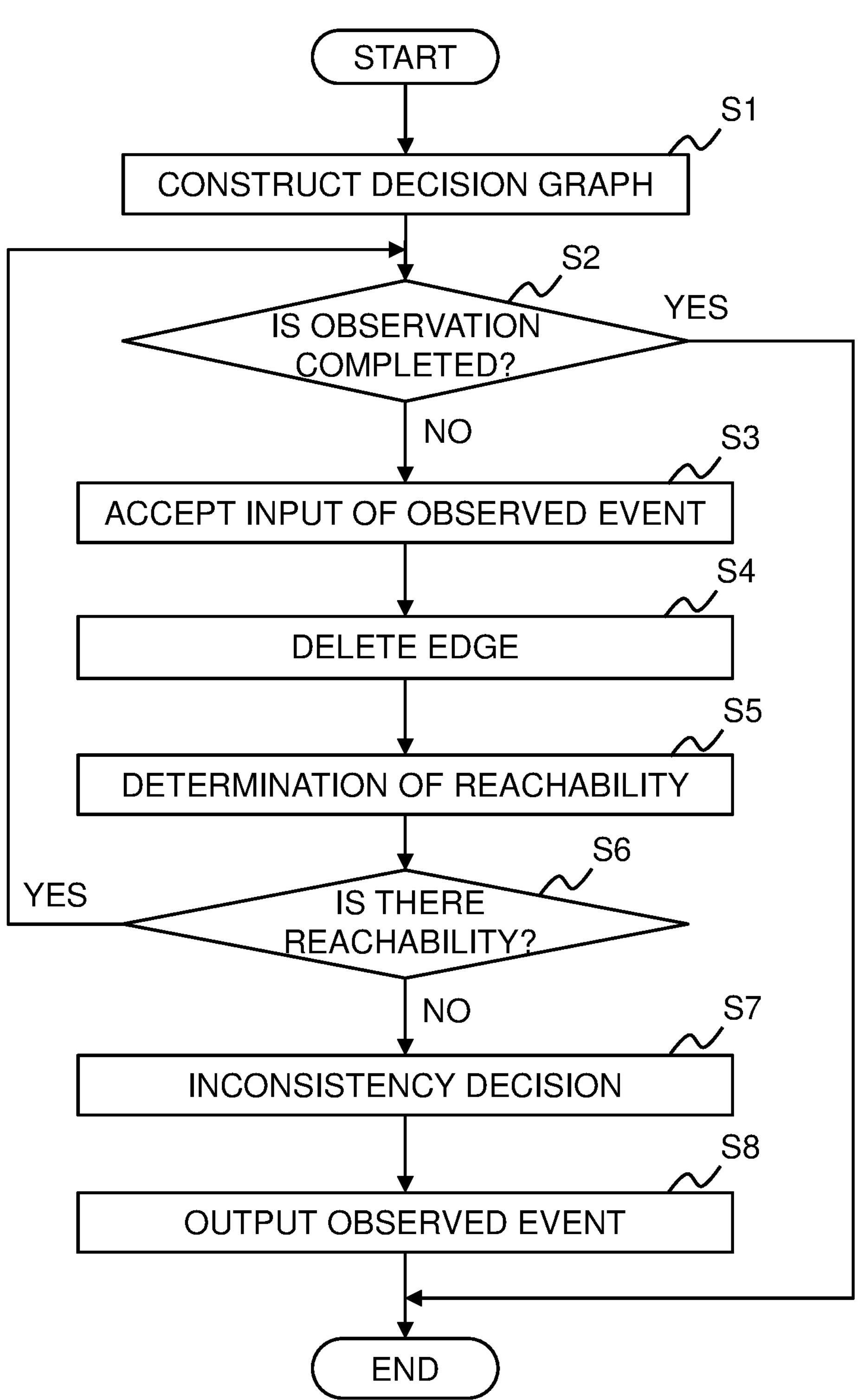
FIG. 6 It depicts a flowchart showing an operation example of an inconsistency detection device of the first exemplary embodiment.

Next, the operation of this exemplary embodiment of the inconsistency detection device 1 will be explained. FIG. 6 is a flowchart showing an operation example of an inconsistency detection device 1 of this exemplary embodiment. In the first exemplary embodiment, the inconsistency detection method is implemented by operating the inconsistency detection device 1. Therefore, the explanation of the inconsistency detection method in the first exemplary embodiment is substituted for the following explanation of the operation of the inconsistency detection device 1.

The construction unit 11 constructs a decision graph based on the knowledge base (step S1). Next, the acceptance unit 12 determines whether observation of the event is completed (step S2). If observation of the event is not completed (step S2: NO), the acceptance unit 12 accepts input of the observed event (step S3). On the other hand, if observation of the event is completed (step S2: YES), this process is terminated.

In the decision graph constructed in step S1, the deletion unit 13 deletes the edges connected to the node corresponding to the observed event accepted in step S3 that indicate a transition to a negation side of the observed event (step S4). Then, the determination unit 14 determines reachability in the decision graph after the deletion of the edge in step S4 (step S5).

If there is reachability (step S6: YES), the repetition control unit 15 controls the acceptance unit 12, the deletion unit 13, and the determination unit 14 to repeat each of the processes from step S2 to step S5. On the other hand, if there is no reachability (step S6: NO), the decision unit 16 decides that the series of observed events accepted so far is inconsistent with respect to the knowledge base (step S7). The output unit 18 then outputs the series of observed events (step S8).

As described above, in this exemplary embodiment, the acceptance unit 12 accepts input of a series of observed events, and the deletion unit 13 deletes edges in the decision graph that are connected to the node corresponding to the accepted observed event. Then, the determination unit 14 determines whether or not a path from the root node to the true-valued leaf node exists in the decision graph after the deletion of the edge, and if it is determined that there is no path to the true-valued leaf node, the decision unit 16 decides that the series of observed events is inconsistent with respect to the knowledge base. Thus, inconsistency of observed events with respect to the knowledge base can be detected.

Exemplary Embodiment 2

Figure 7:
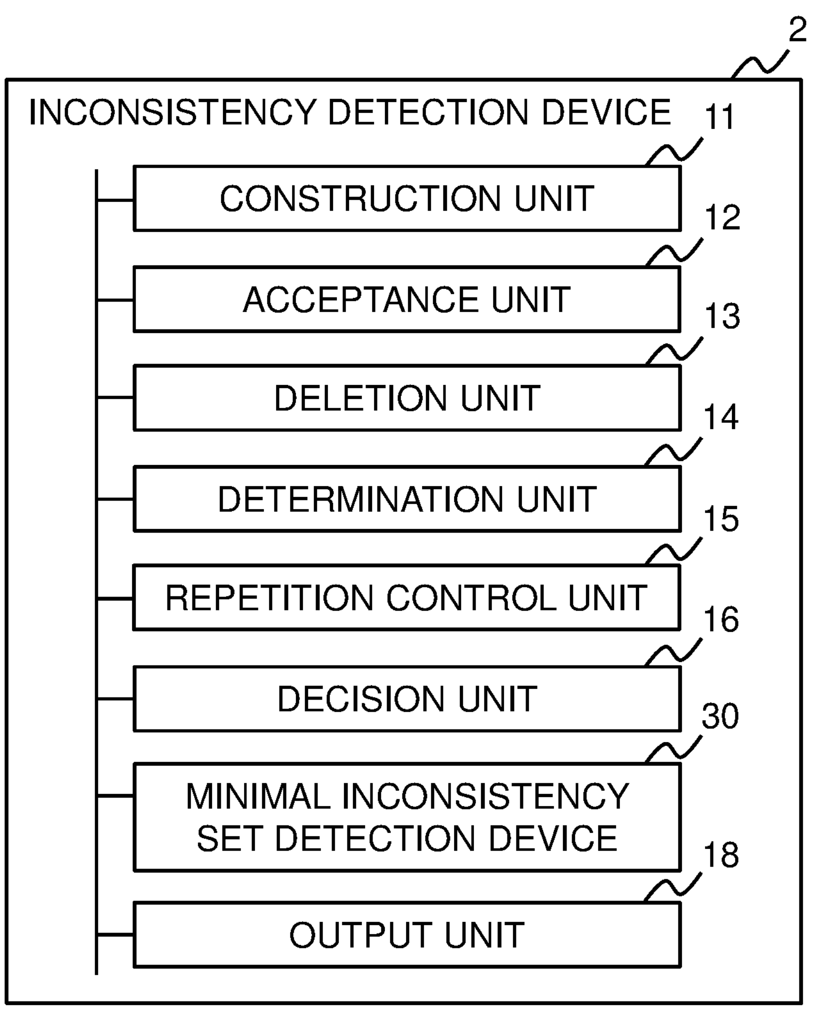
FIG. 7 It depicts a block diagram showing a configuration example of a second exemplary embodiment of an inconsistency detection device according to the present invention.

Next, a second exemplary embodiment of the inconsistency detection device according to the present invention will be described. FIG. 7 is a block diagram showing a configuration example of a second exemplary embodiment of an inconsistency detection device according to the present invention. The inconsistency detection device 2 in this exemplary embodiment includes a construction unit 11, an acceptance unit 12, a deletion unit 13, a determination unit 14, a repetition control unit 15, a decision unit 16, a minimal inconsistency set detection device 30, and an output unit 18.

In other words, the inconsistency detection device 2 of this exemplary embodiment differs from the inconsistency detection device 1 of the first exemplary embodiment in that the minimal inconsistency set detection device 30 is further included. The rest of the configuration is the same as the first exemplary embodiment. Hereinafter, the same configuration as in the first exemplary embodiment is indicated with the same symbol and explanation is omitted.

The minimal inconsistency set detection device 30 is a device that detects a set of truly inconsistent observed events by deleting redundant observed events, and detects minimal set of coverings from a series of observed events that are inconsistent to the knowledge base.

The example shown in FIG. 7 illustrates a configuration in which the minimal inconsistency set detection device 30 is included in the inconsistency detection device 2, but the minimal inconsistency set detection device 30 may be provided independently of the inconsistency detection device 2.

Figure 8:
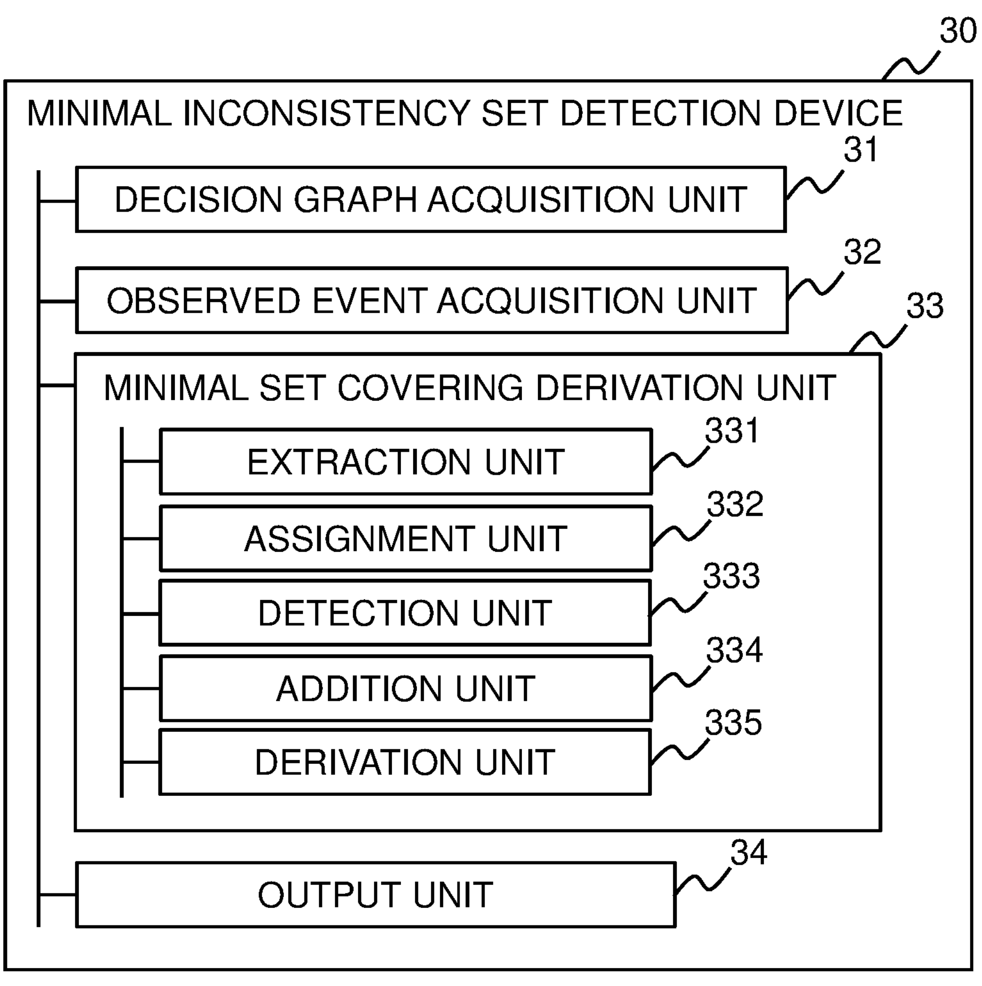
FIG. 8 It depicts a block diagram showing a configuration example of a minimal inconsistency set detection device.

FIG. 8 is a block diagram showing a configuration example of a minimal inconsistency set detection device 30. The minimal inconsistency set detection device 30 includes a decision graph acquisition unit 31, an observed event acquisition unit 32, a minimal set covering derivation unit 33, and an output unit 34.

The decision graph acquisition unit 31 acquires the decision graph constructed by the construction unit 11.

The observed event acquisition unit 32 acquires a series of observed events that are decided by the decision unit 16 to be inconsistent with respect to the knowledge base. Here, it is assumed that the observed event acquisition unit 32 acquires a series of observed events "¬S", "¬U", "P" and "Q" that are decided to be inconsistent in the first exemplary embodiment.

The minimal set covering derivation unit 33 obtains a minimal set covering by transforming a series of observed events obtained by the observed event acquisition unit 32 into a minimal set covering problem using a decision graph. The minimal set covering derivation unit 33 includes an extraction unit 331, an assignment unit 332, a detection unit 333, an addition unit 334, and a derivation unit 335.

The extraction unit 331 extracts all paths from the root node to the "True" leaf node in the decision graph. The method of extracting paths is arbitrary; for example, the extraction unit 331 may extract paths in a diallel method.

Figure 9:
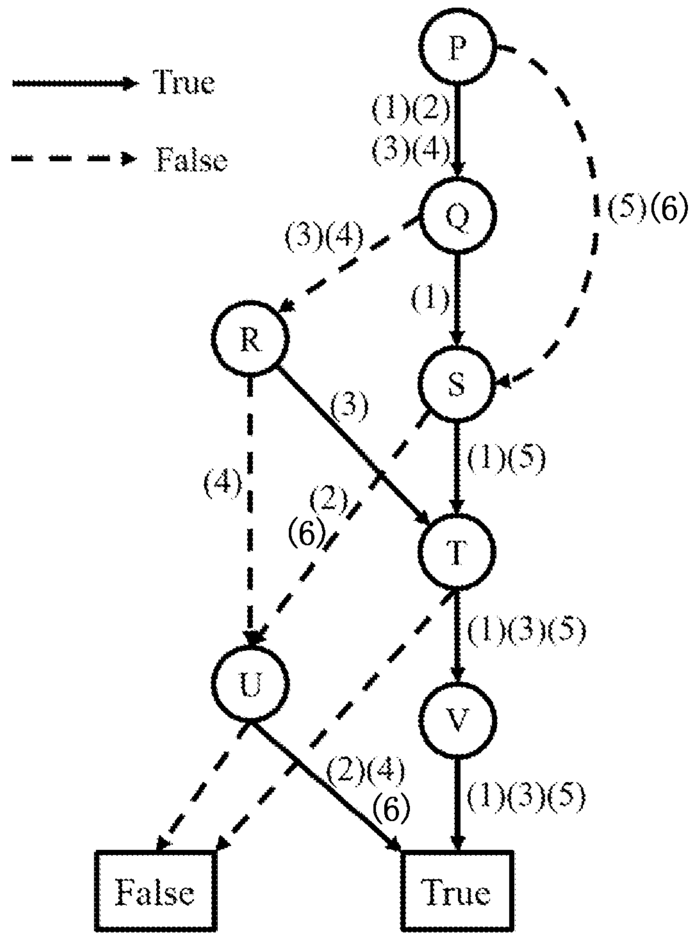
FIG. 9 It depicts an explanatory diagram showing an example of a decision graph with path numbers assigned.

The assignment unit 332 assigns a path number from the root node to the "True" leaf node extracted by the extraction unit 331. FIG. 9 is an explanatory diagram showing an example of a decision graph with path numbers assigned. The assignment unit 332 assigns path numbers (1) to (6) to each edge that constitutes a path, as shown in FIG. 9.

The detection unit 333 detects which of a series of observed events acquired by the observed event acquisition unit 32 will block the path assigned path numbers (1) through (6) when the event is observed. Specifically, the detection unit 333 detects paths that contain edges indicating a transition to a negation side of the observed event in the series of observed events decided to be inconsistent. For example, if the observed event is "¬S", the detection unit 333 detects path numbers (1) and (5).

FIG. 10 is an explanatory diagram showing a list of paths to be blocked for observed events. As illustrated in the first exemplary embodiment, it is assumed that the sequence of observed events decided to be inconsistent with respect to the knowledge base are "¬S", "¬U", "P", and "Q". As described above, the detection unit 333 detects path numbers (1) and (5) for the observed event "¬S". Also, for the observed event "¬U", the detection unit 333 detects paths with path numbers (2), (4), and (6). Similarly, the detection unit 333 detects paths with numbers (5) and (6) for the observed event "P", and detects paths with numbers (3) and (4) for the observed event "Q".

The addition unit 334 adds the path number of the path detected for each observed event in the series of events determined to be inconsistent to each observed event. Specifically, the addition unit 334 performs association as illustrated in FIG. 10.

The derivation unit 335 derives a minimal set of coverings of all path numbers from the observed events to which path numbers are added. In other words, the derivation unit 335 derives the smallest combination of observed events that satisfies all path numbers (1) through (6). In the case of the example shown in FIG. 10, the combination of events "¬S", "¬U", and "Q" satisfies all path numbers (1) through (6). This means that one of the minimal combinations of observed events that are inconsistent with respect to the knowledge base is "¬S", "¬U", and "Q". In this way, the reliability of inconsistency detection can be improved by obtaining the minimal set covering from multiple observed events that are considered to be inconsistent to the knowledge base.

The output unit 34 outputs the result of the minimal set covering obtained by the minimal set covering derivation unit 33. If the decision unit 16 detects an inconsistency, the output unit 34 may output the series of observed events that are accepted by the acceptance unit 12 until the inconsistency is decided, such as "¬S", "¬U", "¬P", and "¬Q". The output unit 34 may, for example, output the result of the minimal set covering to the external unit of the inconsistency detection device 2. If the inconsistency detection device 2 is equipped with a display device (not shown), the output unit 34 may output the results of the minimal set covering to that display device.

The extraction unit 331, the assignment unit 332, the detection unit 333, addition unit 334, and the derivation unit 335 are realized by a computer processor operating according to the program. This program may be included as part of the inconsistency detection program described above, or may be a stand-alone program (the minimal set covering derivation program).

Figure 11:
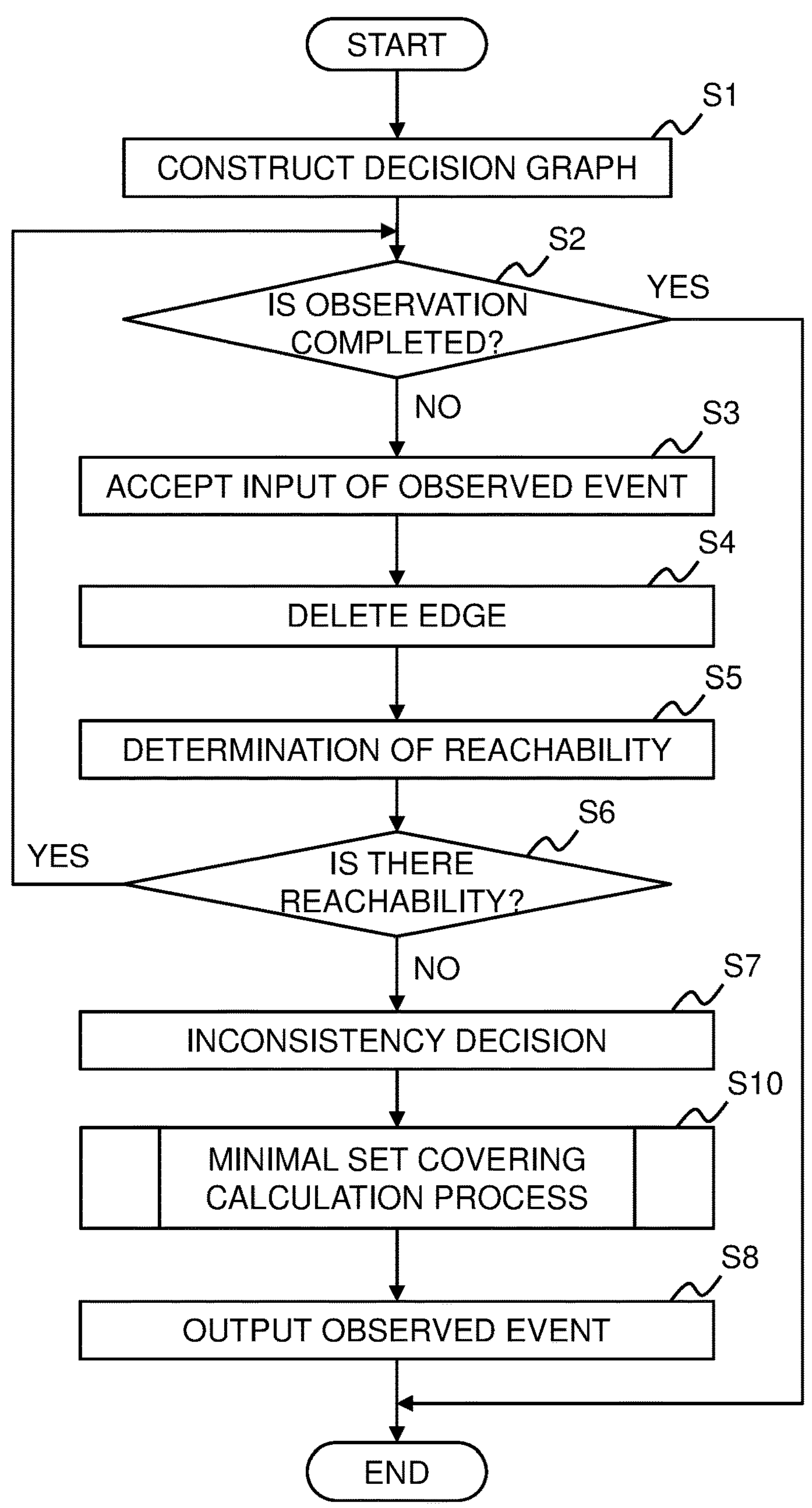
FIG. 11 It depicts a flowchart showing an operation example of an inconsistency detection device of the second exemplary embodiment.

Next, the operation of this exemplary embodiment of the inconsistency detection device 2 will be explained. FIG. 11 a flowchart showing an operation example of an inconsistency detection device 2 of this exemplary embodiment. In the second exemplary embodiment, the inconsistency detection method is implemented by operating the inconsistency detection device 2. Therefore, the explanation of the inconsistency detection method in the second exemplary embodiment is substituted for the following explanation of the operation of the inconsistency detection device 2.

The process from step S1 to step S7, which determines a series of observed events that are inconsistent with respect to the knowledge base, is the same as the process from Step S1 to Step S7 in the flowchart illustrated in FIG. 6.

The minimal inconsistency set detection device 30 performs a minimal set covering calculation process to detect minimal set covering from a series of observed events that are inconsistent with respect to the knowledge base (step S10). The output unit 18 then outputs the series of observed events (step S8).

Figure 12:
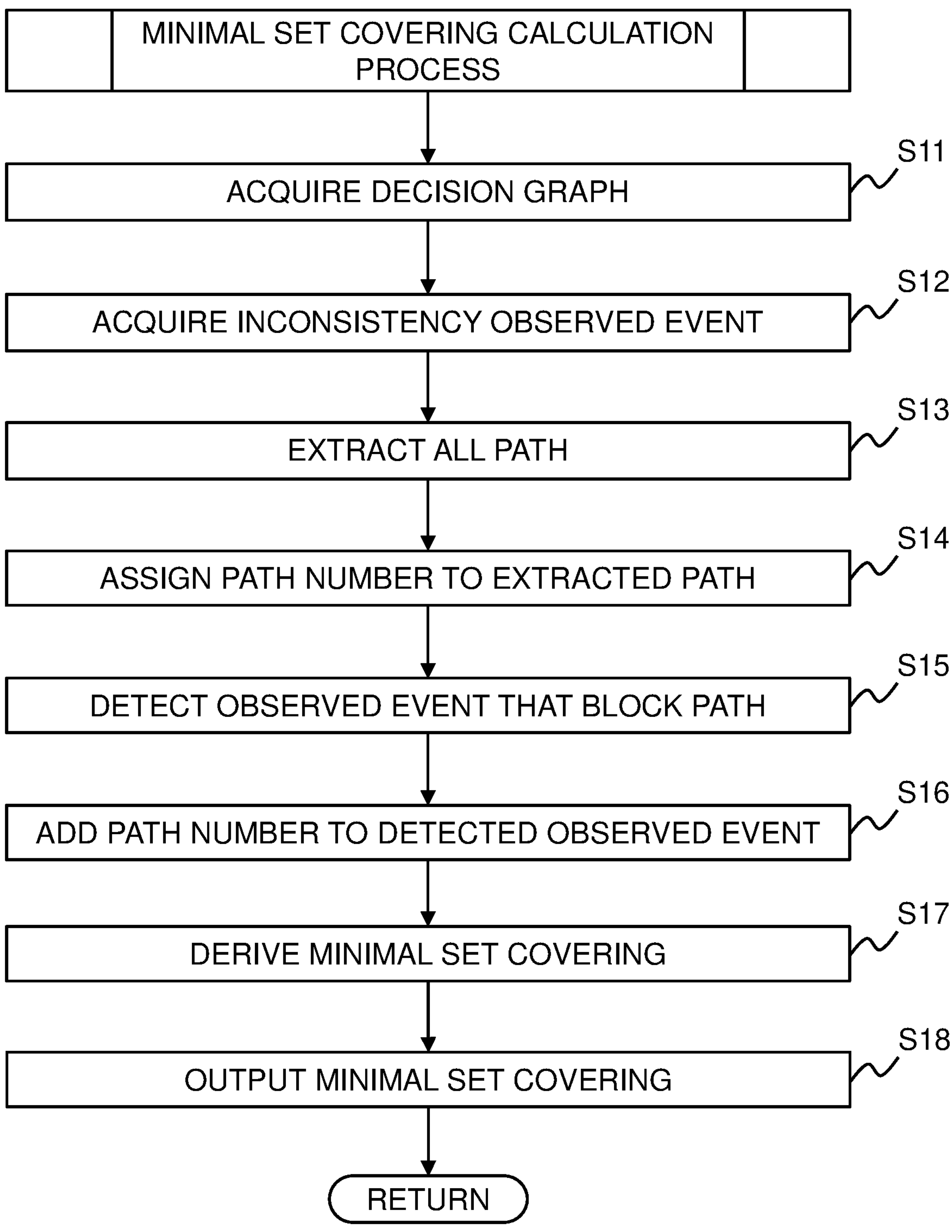
FIG. 12 It depicts a flowchart showing an example of a minimal set covering calculation process performed by a minimal inconsistency set detection device.

FIG. 12 is a flowchart showing an example of the minimal set covering calculation process performed by the minimal inconsistency set detection device 30.

The decision graph acquisition unit 31 acquires the decision graph constructed by the construction unit 11 (step S11). The observed event acquisition unit 32 acquires the series of observed events that the decision unit 16 is decided to be inconsistent (step S12). The extraction unit 331 of the minimal set covering derivation unit 33 extracts all paths from the root node to the "True" leaf node in the decision graph obtained in step S11 (step S13).

As illustrated in FIG. 9, the assignment unit 332 of the minimal set covering derivation unit 33 assigns path numbers to all of the paths extracted in step S13 (step S14). Next, the detection unit 333 of the minimal set covering derivation unit 33 detects the observed events that block the paths assigned path numbers from a series of observed events (step S15). Then, the addition unit 334 of the minimal set covering derivation unit 33 adds the path number of the path to be blocked to the observed event detected in step S15 (step S16), as illustrated in FIG. 10.

The derivation unit 335 derives the minimal set covering of all path numbers from the observed events that are added path numbers in step S16 (step S17). Then, the output unit 34 outputs the derived minimal set covering (step S18).

As described above, in this exemplary embodiment, the extraction unit 331 extracts all paths from the decision graph from the root node to the true-valued leaf node, and the assignment unit 332 assigns path numbers to all of the extracted paths. In addition, the detection unit 333 detects a path including an edge indicating a transition to a negation side of the observed event in the series of observed events decided to be inconsistent, and the addition unit 334 adds the path number of the detected path to each of the observed events. Then, the derivation unit 335 derives a minimal set of covering of all path numbers from the observed events to which path numbers are added.

Thus, in addition to the effects of the first exemplary embodiment, a truly inconsistent set of observed events can be detected by deleting redundant observed events.

Exemplary Embodiment 3

Figure 13:
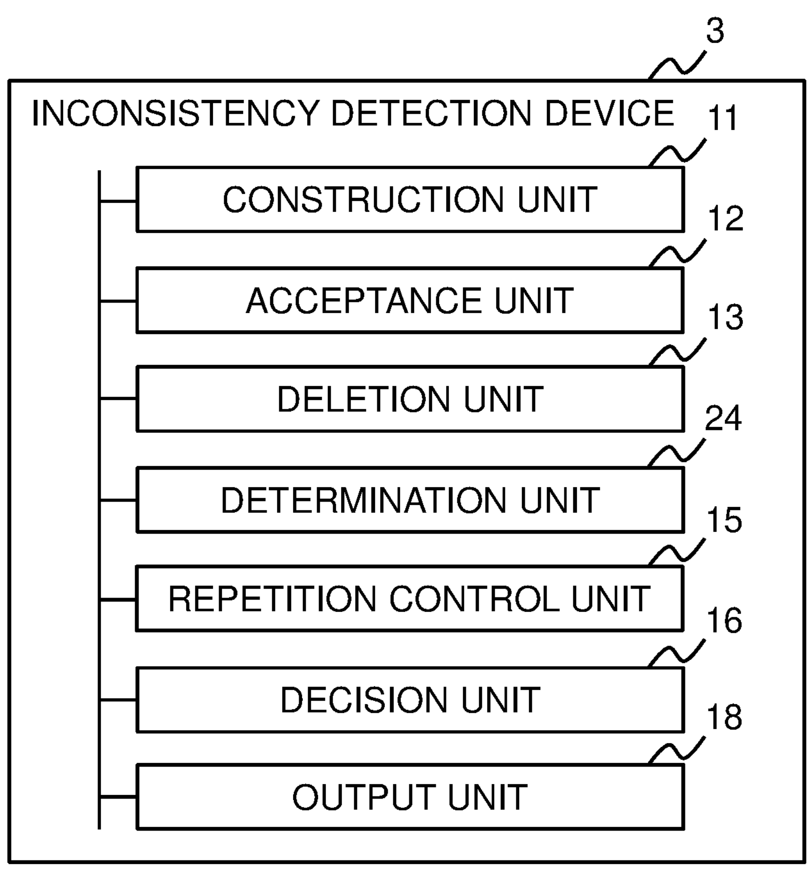
FIG. 13 It depicts a block diagram showing a configuration example of a third exemplary embodiment of an inconsistency detection device according to the present invention.

Next, a third exemplary embodiment of the inconsistency detection device according to the present invention is described. Compared to the first exemplary embodiment, the third exemplary embodiment differs in the method of determining reachability for the knowledge base. FIG. 13 is a block diagram showing a configuration example of a third exemplary embodiment of an inconsistency detection device according to the present invention. The inconsistency detection device 3 in this exemplary embodiment includes a construction unit 11, an acceptance unit 12, a deletion unit 13, a determination unit 24, a repetition control unit 15, a decision unit 16, and an output unit 18.

In other words, the inconsistency detection device 3 of this exemplary embodiment differs from the inconsistency detection device 1 of the first exemplary embodiment in that it is equipped with the determination unit 24 instead of the determination unit 14. The rest of the configuration is the same as in the first exemplary embodiment. Hereinafter, the same configuration as in the first exemplary embodiment is indicated with the same symbol and explanation is omitted. The inconsistency detection device 3 may be equipped with the second exemplary embodiment of the minimal inconsistency set detection device 30.

Similar to the determination unit 14 of the first exemplary embodiment, the determination unit 24 determines whether or not a path exists from the root node to a true-valued leaf node in the decision graph after the deletion unit 13 deletes the edge. The determination unit 24 of this exemplary embodiment sets a label to the node for which no path to the true-valued leaf node exists at the final transition destination in the decision graph after the deletion unit 13 deletes the edge. The determination unit 24 determines that no path to the true-valued leaf node exists when a label is set to the root node. In the following description, this label is sometimes referred to as a "False" label.

Figure 14:
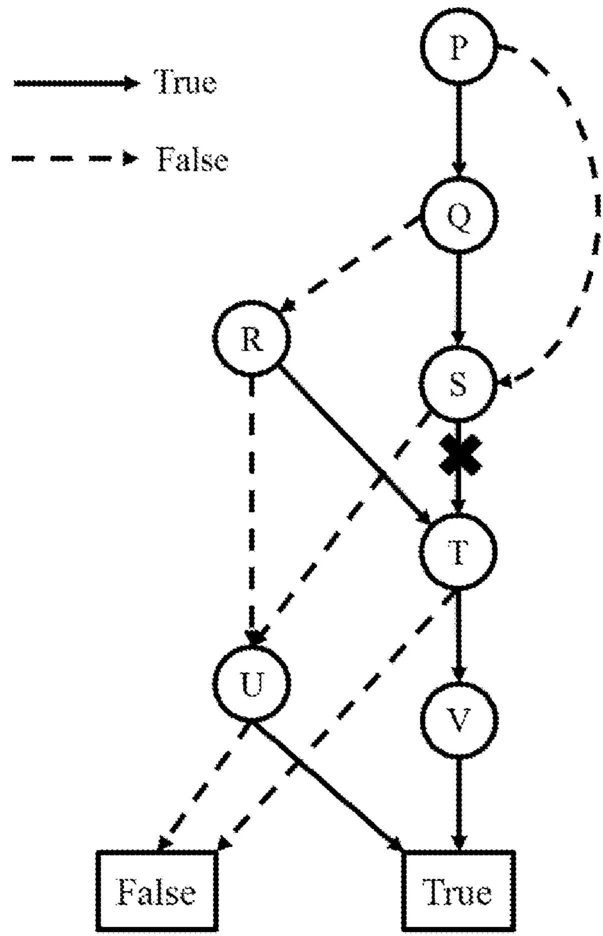
FIG. 14 It depicts an explanatory diagram showing an example of the process for determining whether or not a path exists.
Figure 15:
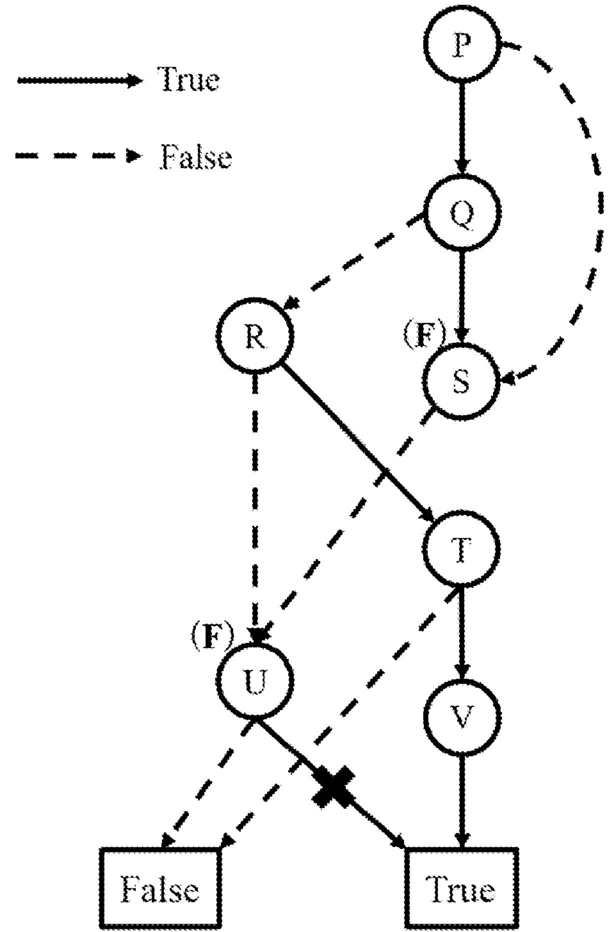
FIG. 15 It depicts an explanatory diagram showing an example of the process for determining whether or not a path exists.

The following concrete examples are used to explain the operation of the determination unit 24 in this exemplary embodiment. FIG. 14 and FIG. 15 are explanatory diagrams showing examples of the process for determining whether or not a path exists by the determination unit 24.

In the decision graph whose edges are deleted by the deletion unit 13, the determination unit 24 sets "False" label to the node that does not contain "True" leaf node at the final transition destination. In the example shown in FIG. 14, if the observed event is "¬S", the deletion unit 13 deletes "True" edge connected to node "S". In this case, there is no node that does not contain "True" leaf node at the final transition destination.

FIG. 15 shows, for the decision graph illustrated in FIG. 14, the graph after the deletion unit 13 deletes "True" edge connected to node "S". For example, if the next observed event is "¬U", the deletion unit 13 deletes "True" edge connected to node "U". As a result, node "U" and node "S" do not contain "True" leaf node at the final transition destination. Therefore, the determination unit 24 sets "False" label to node "U" and node "S". In the example shown in FIG. 15, "False" label is represented by (F).

By repeating this process, the determination unit 24 determines that if a label is set on the root node (node "P"), there is no path from the root node to "True" leaf node. In other words, in this case, the determination unit 24 determines that there is no reachability. On the other hand, if no label is set to the root node, the determination unit 24 determines that there is a path from the root node to "True" leaf node. In other words, in this case, the determination unit 14 determines that there is reachability.

As in the first exemplary embodiment, the repetition control unit 15 controls the acceptance unit 12, the deletion unit 13, and the determination unit 24 to execute the process again when the determination unit 24 determines that there is reachability.

The construction unit 11, the acceptance unit 12, the deletion unit 13, the determination unit 24, the repetition control unit 15, the decision unit 16, and the output unit 18 are realized by a computer processor that operates according to a program (inconsistency detection program).

Next, the operation of this exemplary embodiment of the inconsistency detection device 3 will be described. In the third exemplary embodiment, the inconsistency detection method is implemented by operating the inconsistency detection device 3. Therefore, the explanation of the inconsistency detection method in the third exemplary embodiment is substituted for the following explanation of the operation of the inconsistency detection device 3. The operation of the inconsistency detection device 3 in this exemplary embodiment is similar to the operation shown in the flowchart illustrated in FIG. 6. However, the process in step S5 of FIG. 6, which performs reachability determination, differs from the first exemplary embodiment.

FIG. 16 is a flowchart showing an example of a determination process regarding reachability. The following is a specific explanation of determination process of this exemplary embodiment, assuming that the observed events are input in the order "¬S", "¬U", and "Q".

Figure 17:
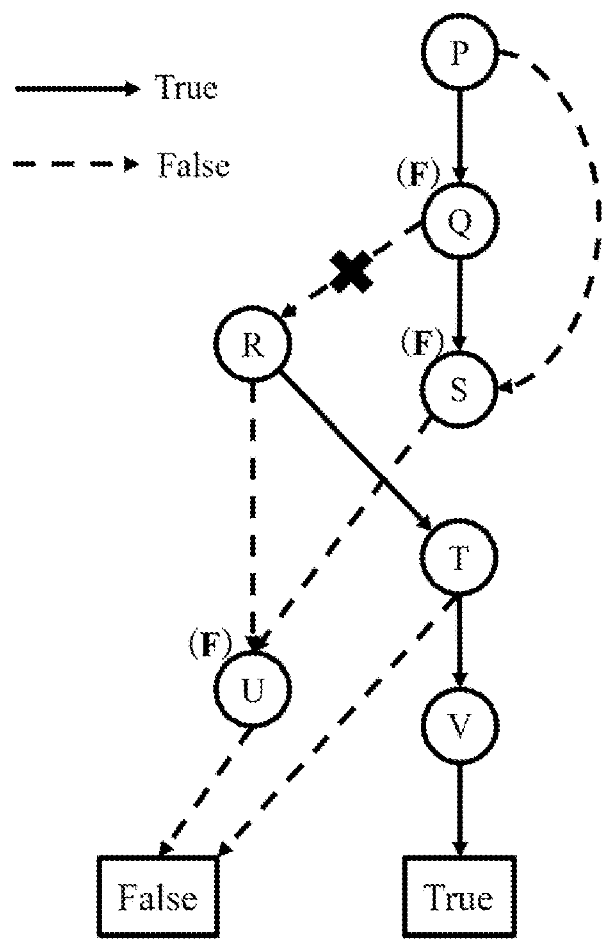
FIG. 17 It depicts an explanatory diagram showing another example of the process for determining whether or not a path exists.
Figure 18:
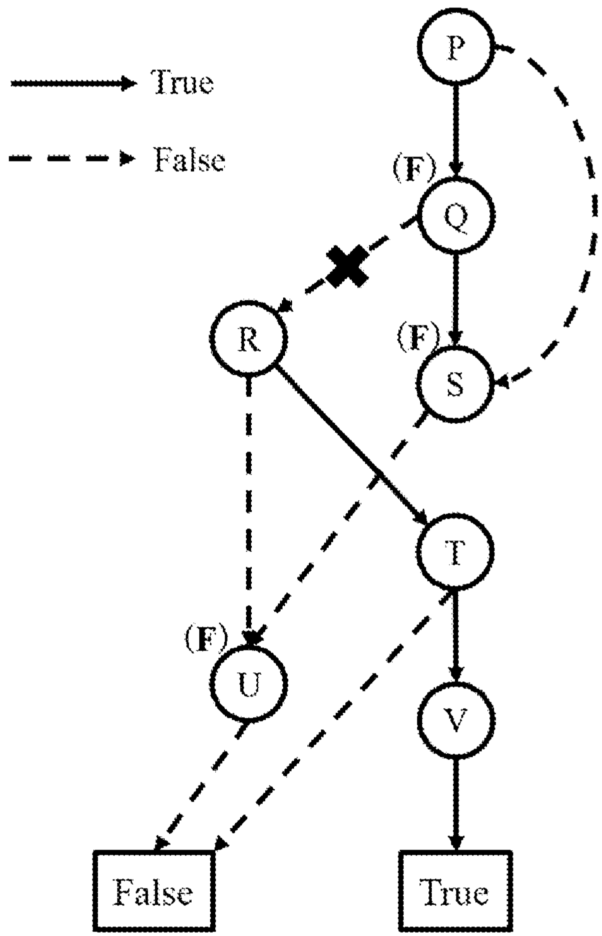
FIG. 18 It depicts an explanatory diagram showing another example of the process for determining whether or not a path exists.
Figure 19:
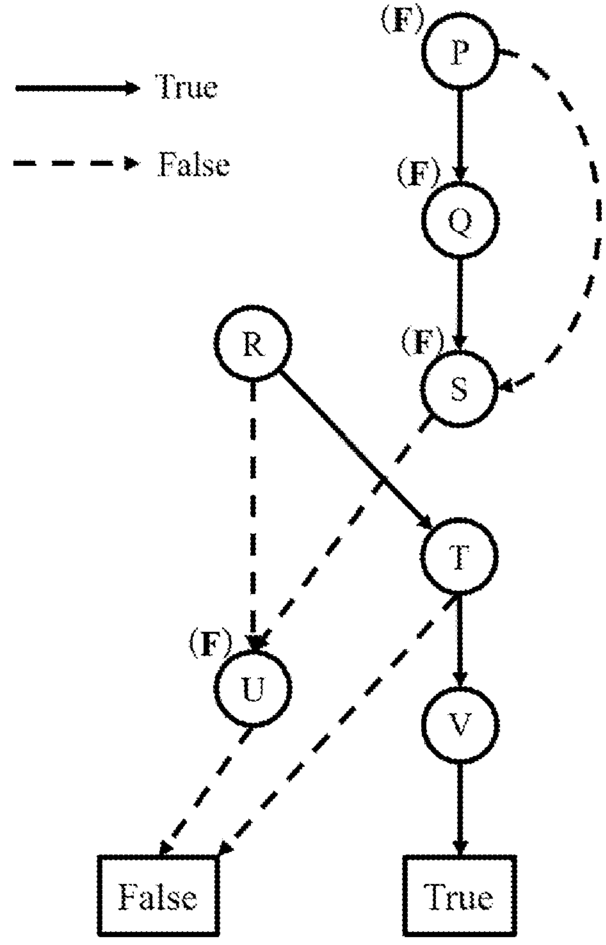
FIG. 19 It depicts an explanatory diagram showing another example of the process for determining whether or not a path exists.

FIGS. 17 through 19 are explanatory diagrams showing other examples of the process for determining whether or not a path exists.

First, the acceptance unit 12 accepts the input of the observed event "¬S", and the deletion unit 13 deletes "True" edge connected to node "¬S" (see FIG. 14). In the decision graph after this deletion, the determination unit 24 determines whether the child node is only "False" leaf node or "False" labeled node (step S31). Specifically, the determination unit 24 determines whether the child node of node "S" is only "False" leaf node or "False" labeled node. As illustrated in FIG. 14, the child node "U" of node "S" has no label set. In this case (step S31: NO), the determination unit 24 determines that there is reachability to "True" (step S37), and the process from step S31 and onward are repeated.

Then, the acceptance unit 12 accepts the input of the observed event "¬U" and the deletion unit 13 deletes the "True" edge connected to the node "U" (see FIG. 15). In the decision graph after this deletion, the determination unit 24 determines whether the child node of node "U" is only "False" leaf node or "False" labeled node (step S31). As illustrated in FIG. 15, the transition destination of node "U" is only "False" leaf node. In this case (step S31: YES), the determination unit 24 determines sets a label of "False" for node "U" (step S32).

Next, the determination unit 24 determines whether or not the number of child nodes connected to the parent node of the labeled node is one (step S33). Specifically, the determination unit 24 determines whether the number of child node of the parent node "R" of the node "U" is one. As illustrated in FIG. 15, node "R" has two child nodes, node "U" and node "T" (step S33: NO). Furthermore, the determination unit 24 determines whether the other child nodes of the above parent node are labeled "False" or "False" leaf nodes (Step S35). Specifically, the determination unit 24 determines whether the other child node "T" of the parent node "R" is labeled "False" or "False" leaf node. As illustrated in FIG. 15, the other child node "T" of node "R" is not labeled "False" (Step S35: NO).

After that, the determination unit 24 determines whether the determination process for all other parent nodes is complete or not (step S39). As illustrated in FIG. 15, the process for the other parent node "S" is not complete (step S39: NO). Therefore, the determination unit 24 determines whether or not the number of child node of the parent node "S" of the node "U" is one (step S33). As illustrated in FIG. 15, the parent node "S" has one child node (Step S33: YES). Therefore, the determination unit 24 sets a label of "False" for node "S" (Step S34). Then, the determination unit 24 performs the label operation on the parent node of the node "S" labeled "False".

The determination unit 24 determines whether the number of child node of the parent node "Q" of the node "S" is one (step S33). As illustrated in FIG. 15, node "R" has two child nodes, node "R" and node "S" (step S33: NO). Furthermore, the determination unit 24 determines whether the other child node "R" of the parent node "Q" is labeled "False" or "False" leaf node. As illustrated in FIG. 15, the other child node "R" of node "Q" is not labeled "False" (Step S35: NO).

After that, the determination unit 24 determines whether the determination process for all other parent nodes is complete or not (step S39). As illustrated in FIG. 15, the process for the other parent node "P" is not complete (step S39: NO). Therefore, the determination unit 24 determines whether or not the number of child node of the parent node "P" of the node "S" is one (step S33). As illustrated in FIG. 15, the parent node "S" has two child nodes, node "Q" and node "S" (Step S33: NO). Furthermore, the determination unit 24 determines whether the other child node "Q" of the parent node "P" is labeled "False" or "False" leaf node (step S35). As illustrated in FIG. 15, the other child node "Q" of the parent node "P" is not labeled "False" (Step S35: NO).

After that, the determination unit 24 determines whether the determination process for all other parent nodes is complete or not (step S39). As illustrated in FIG. 15, the determination process for all other parent nodes is complete (step S39: YES). Then, the determination unit 24 determines whether or not a label is set to the root node (step S36). As illustrated in FIG. 15, no label is set to the root node "P". In this case (step S36: NO), the determination unit 24 determines that there is reachability (step S37).

Then, the acceptance unit 12 accepts the input of observed event "Q" and the deletion unit 13 deletes "False" edge connected to node "Q" (see FIG. 17). In the decision graph after this deletion, the determination unit 24 determines whether the child node of node "Q" is only "False" leaf node or "False" labeled node (step S31). As illustrated in FIG. 17, the child node "S" of node "Q" is labeled "False". In this case (step S31: YES), the determination unit 24 sets a label of "False" for node "Q" (step S32) (see FIG. 18).

Then, the determination unit 24 determines whether the number of child node of the parent node "P" of the node "Q" is one. As illustrated in FIG. 17, node "P" has two child nodes, node "Q" and node "S" (step S33: NO).

Then, the determination unit 24 determines whether the other child node "S" of the parent node "P" of the node "Q" is labeled "False" or "False" leaf node (step S35). As illustrated in FIG. 18, the other child node "S" of the parent node "P" is labeled "False" (Step S35: YES). In this case (step S35: YES), the determination unit 24 sets a label of "False" for node "P" (step S32) (see FIG. 19).

Node "P" is a root node and has no parent node. In this case (step S33: NO) (step S35: NO) (Step S39: NO), the determination unit 24 determine whether or not a label is set to the root node (step S36). As illustrated in FIG. 19, a label is set to the root node. In this case (step S36: YES), the determination unit 24 determines that there is no reachability (step S38).

As described above, in this exemplary embodiment, the determination unit 24 sets a label to the node for which no path to the true-valued leaf node exists at the final transition destination in the decision graph after the edge is deleted, and determines that no path to the true-valued leaf node exists when the label is set to the root node.

Therefore, in addition to the effects of the first exemplary embodiment, the process of determining reachability can be accelerated by setting a label for the final transition destination at each node. As a result, the processing time for detecting inconsistencies can be shortened. Exemplary embodiment 4.

Figure 20:
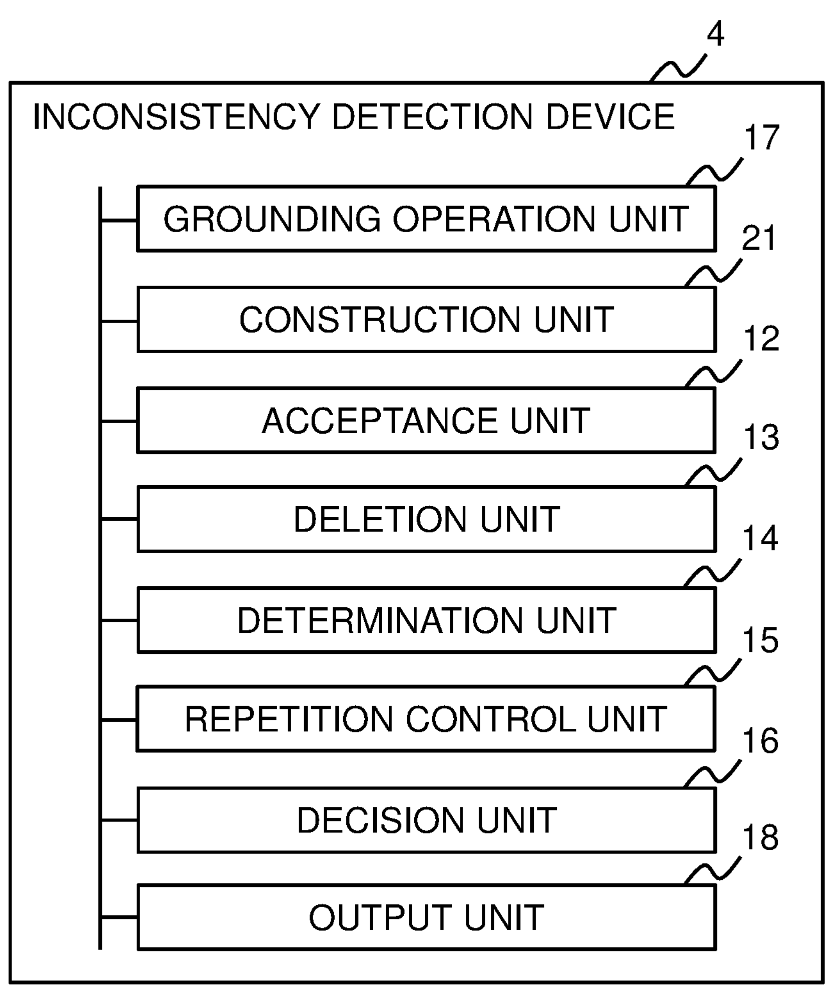
FIG. 20 It depicts a block diagram showing a configuration example of a fourth exemplary embodiment of an inconsistency detection device according to the present invention.

Next, a fourth exemplary embodiment of the inconsistency detection device according to the present invention is described. The fourth exemplary embodiment describes a specific method of constructing a decision graph. FIG. 20 is a block diagram showing a configuration example of a fourth exemplary embodiment of an inconsistency detection device according to the present invention. The inconsistency detection device 4 in this exemplary embodiment includes a grounding operation unit 17, a construction unit 21, an acceptance unit 12, a deletion unit 13, a determination unit 14, a repetition control unit 15, a decision unit 16, and an output unit 18.

That is, compared to the inconsistency detection device 1 of the first exemplary embodiment, the inconsistency detection device 4 of this exemplary embodiment differs in that it is further equipped with the grounding operation unit 17 and equipped with the construction unit 21 instead of the construction unit 11. Other configurations are similar to the first exemplary embodiment. Hereinafter, the same configuration as in the first exemplary embodiment will be indicated with the same symbol and explanation will be omitted. The inconsistency detection device 4 may be equipped with the minimal inconsistency set detection device 30 of the second exemplary embodiment. The determination unit 14 of the inconsistency detection device 4 may be realized by the determination unit 24 of the third exemplary embodiment.

The grounding operation unit 17 performs grounding operation based on the Herbrand universe of the knowledge base. As explained in the first exemplary embodiment, the knowledge base is represented by an implication relation rule of a first-order predicate logic formula. The Herbrand space is a region in which constants that can be included in the variables of each predicate are defined for the first-order predicate formula. The grounding operation is a process in which the constants in the Herbrand universe are assigned to the first-order predicate logic formulas so that they can be treated as the propositional formula.

For example, given the predicate Eat (people, food), "people" and "food" are predicate variables. Then, Herbrand universe means that people={Andy, Bob, and Cathy}, food={Donuts, Eggs, Fish}, and so on. In contrast, the grounding operation yields, as propositional formulas, Eat (Andy, Donut), Eat (Andy, Egg), Eat (Cathy, Fish), etc. are generated.

The construction unit 21 constructs the decision graph from the propositional logic formula generated by the grounding operation unit 17. The method by which construction unit 21 generates the decision graph is the same as the method by which the construction unit 11 in the first exemplary embodiment generates the decision graph.

The grounding operation unit 17, the construction unit 21, the acceptance unit 12, the deletion unit 13, the determination unit 14, the repetition control unit 15, the decision unit 16, and the output unit 18 are realized by a computer processor that operates according to a program (inconsistency detection program).

Figure 21:
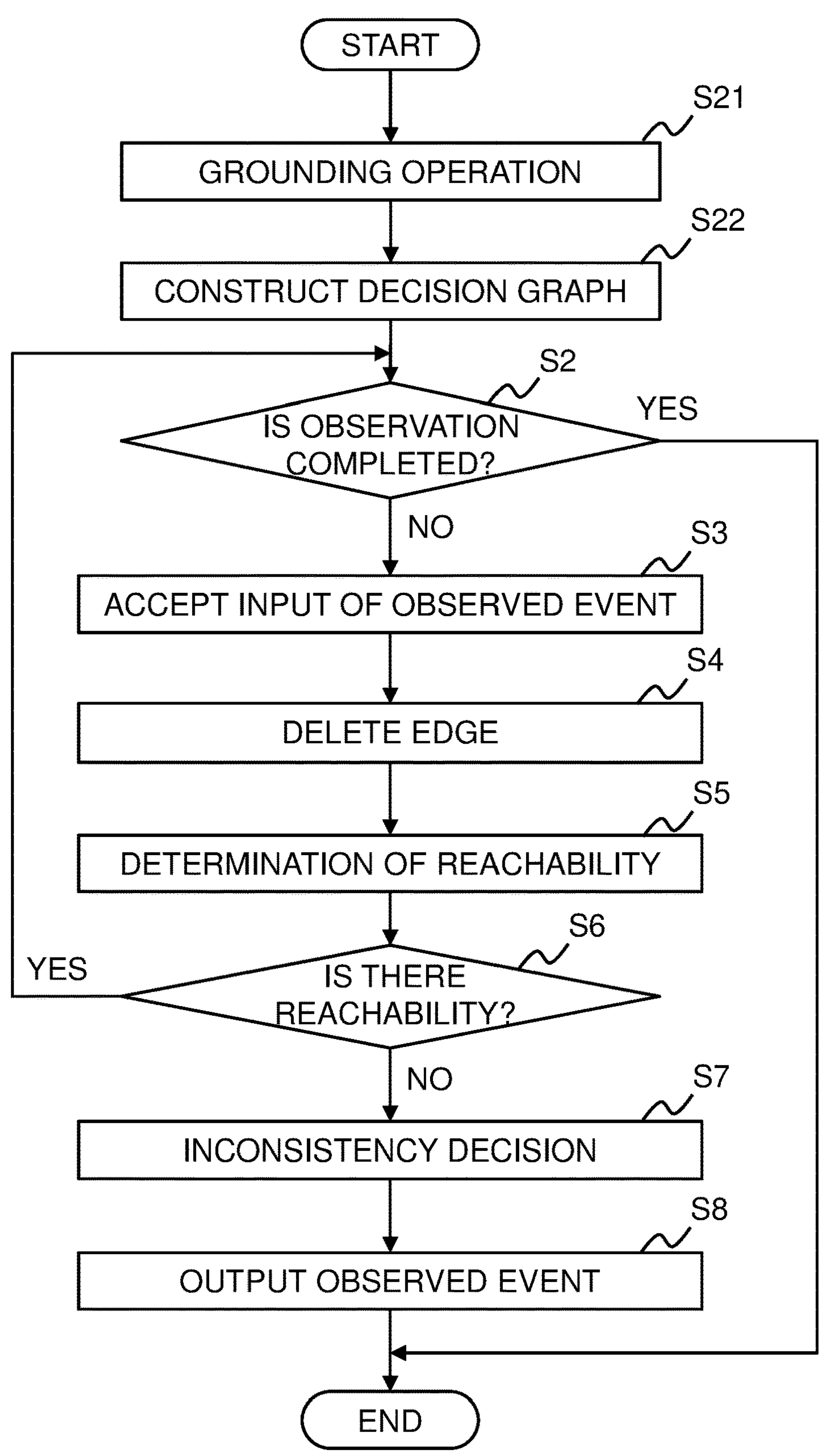
FIG. 21 It depicts a flowchart showing an operation example of an inconsistency detection device of the fourth exemplary embodiment.

Next, the operation of the inconsistency detection device 4 of this exemplary embodiment is described. FIG. 21 is a flowchart showing an operation example of an inconsistency detection device 4 of this exemplary embodiment. In the fourth exemplary embodiment, the inconsistency detection method is implemented by operating the inconsistency detection device 4. Therefore, the explanation of the inconsistency detection method in the fourth exemplary embodiment is substituted for the following explanation of the operation of the inconsistency detection device 4.

First, the grounding operation unit 17 generates a propositional formula by performing grounding operations based on the Herbrand universe of the knowledge base (step S21). Then, the construction unit 21 constructs a decision graph from the propositional formula generated in step S21 (step S22).

Thereafter, the process from step S2 to step S8, which decides a series of observed events that are inconsistent with respect to the knowledge base, is the same as the process from step S2 to step S8 in the flowchart illustrated in FIG. 6.

As described above, in this exemplary embodiment, the grounding operation unit 17 performs grounding operation based on the Herbrand universe of the knowledge base, and the construction unit 21 constructs the decision graph from a generated propositional formula. Thus, in addition to the effects of the first exemplary embodiment, it is possible to construct a decision graph appropriately even when the knowledge base is represented in the Herbrand universe.

[Physical Configuration]

Figure 22:
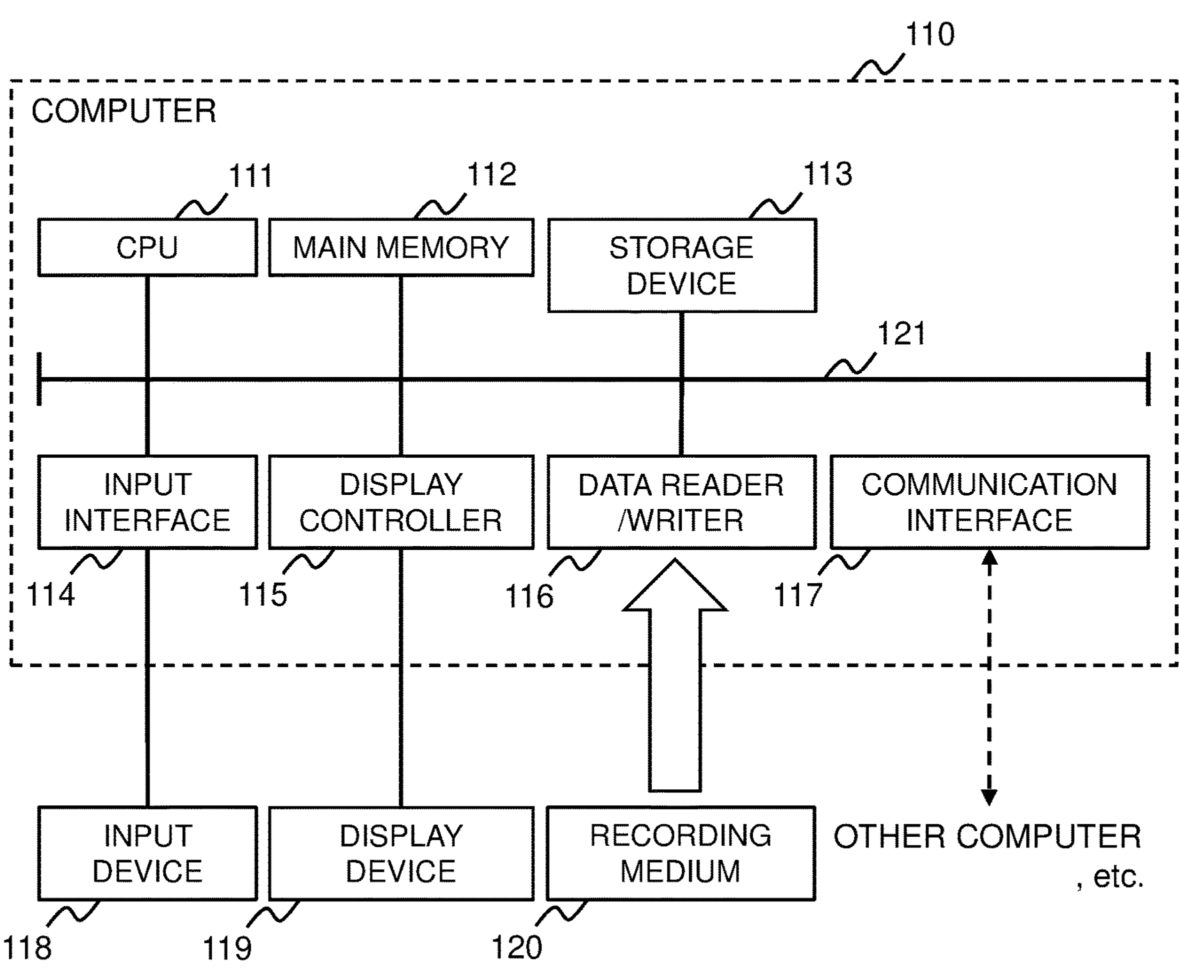
FIG. 22 It depicts a block diagram showing an example of a computer that realizes an inconsistency detection device.

The computer that realizes the inconsistency detection device by executing the programs described in exemplary Embodiments 1~4 is described here using FIG. 22. FIG. 22 is a block diagram showing an example of a computer that realizes an inconsistency detection device.

As illustrated in FIG. 22, a computer 110 includes a CPU 111, a main memory 112, a storage device 113, an input interface 114, a display controller 115, a data reader/writer 116, and a communication interface 117. These parts are connected to each other via bus 121 to enable data communication. Note that the computer 110 may include a GPU or FPGA (Field-Programmable Gate Array) in addition to or instead of the CPU 111.

The CPU 111 expands the programs (codes) in Embodiments 1-4 stored in the storage device 113 into the main memory 112 and executes them in a predetermined order to perform various calculations. The main memory 112 is typically a volatile storage device such as DRAM (Dynamic Random Access Memory). The programs in exemplary Embodiments 1-4 are provided as stored in a computer-readable recording medium 120. The programs in exemplary Embodiments 1-4 may be distributed on the Internet connected via communication interface 117.

Examples of the storage device 113 include semiconductor storage devices such as flash memory as well as hard disk drives. The input interface 114 mediates data transmission between CPU 111 and input devices 118 such as a keyboard and mouse. The display controller 115 is connected to the display device 119 and controls the display on the display device 119.

The data reader/writer 116 mediates data transmission between CPU 111 and the recording medium 120, reads programs from the recording medium 120, and writes processing results in computer 110 to recording medium 120. The communication interface 117 mediates data transmission between CPU 111 and other computers.

Also, as specific examples of the recording medium 120 include general-purpose semiconductor storage devices such as CF (Compact Flash (registered trademark)) and SD (Secure Digital), magnetic recording media such as Flexible Disk, and optical recording media such as CD-ROM (Compact Disk Read Only Memory).

The inconsistency detection device in exemplary embodiments 1-4 can also be realized by using hardware corresponding to each part, instead of a computer on which the program is installed. Furthermore, the inconsistency detection device may be partially realized by a program and the remaining parts may be realized by hardware.

Figure 23:
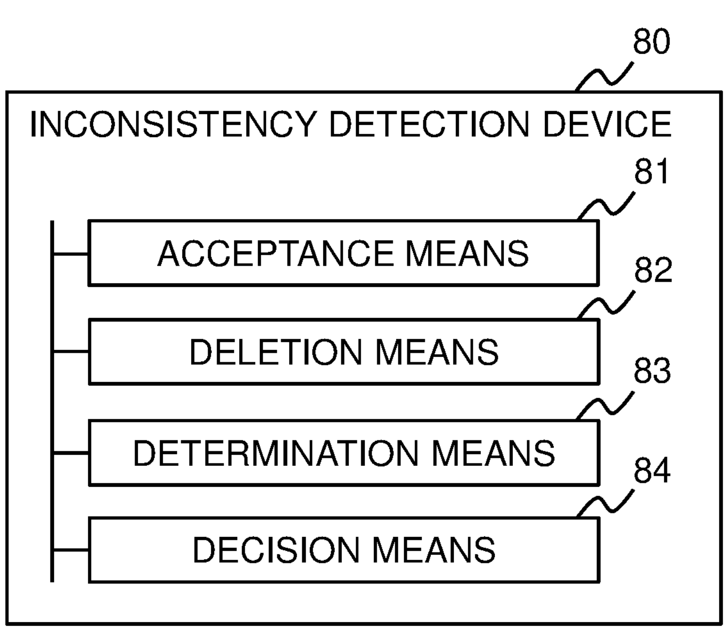
FIG. 23 It depicts a block diagram showing an overview of an inconsistency detection device according to the present invention.

Next, an overview of the present invention will be described. FIG. 23 is a block diagram showing an overview of an inconsistency detection device according to the present invention. The inconsistency detection device 80 (e.g., inconsistency detection devices 1-4) according to the present invention includes: an acceptance means 81 (e.g., acceptance unit 12) which accepts input of a series of observed events including one or more observed events; a deletion means 82 (e.g., deletion unit 13) which deletes, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the observed event accepted by the acceptance means 81; a determination means 83 (e.g., determination unit 14) which determines whether or not a path from a root node to a true-valued leaf node (e.g., "True" node) exists in the decision graph after the deletion of the edge by the deletion means 82; and a decision means 84 (e.g., decision unit 16) which decides that the series of observed events is inconsistent with respect to the knowledge base when the determining means 83 determines that there is no path to the true-valued leaf node.

Such a configuration allows for the detection of inconsistencies in observed events with respect to the knowledge base.

The inconsistency detection device 80 may further include an extraction means (e.g., extraction unit 331) which extracts all paths from the decision graph from the root node to the true-valued leaf node; an assignment means (e.g., assignment unit 332) which assigns path numbers to all of the extracted paths; a detection means (e.g., detection unit 333) which detects a path including an edge indicating a transition to a negation side of the observed event in the series of observed events decided to be inconsistent; an addition means (e.g., addition unit 334) which adds the path number of the detected path to each of the observed events; and a derivation means (e.g., derivation unit 335) which derives a minimal set of coverings of all path numbers from the observed events to which path numbers are added.

Such a configuration allows for the detection of a truly inconsistency set of observed events by deleting redundant observed events.

The determination means 83 may set a label to the node for which no path to the true-valued leaf node exists at final transition destination in the decision graph after the deletion means 82 deletes the edge, and determine that no path to the true-valued leaf node exists when the label is set to the root node.

Such a configuration allows the process of determining reachability to be faster, thus reducing the processing time for detecting inconsistencies.

The inconsistency detection device 80 may further include a grounding operation means (e.g., grounding operation unit 17) which performs grounding operation based on the Herbrand universe of the knowledge base; and a construction means (e.g., construction unit 21) which constructs the decision graph from a propositional formula generated by the grounding operation means.

The inconsistency detection device 80 may further include an output means (e.g., output unit 18) which outputs the series of observed events decided to be inconsistent by the decision means.

Some or all of the aforementioned exemplary embodiment can be described as (Supplementary note 1) through (Supplementary note 11) described below, but are not limited to the following descriptions.

(Supplementary note 1) An inconsistency detection device comprising: an acceptance means which accepts input of a series of observed events including one or more observed events; a deletion means which deletes, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the observed event accepted by the acceptance means; a determination means which determines whether or not a path from a root node to a true-valued leaf node exists in the decision graph after the deletion of the edge by the deletion means; and a decision means which decides that the series of observed events is inconsistent with respect to the knowledge base when the determining means determines that there is no path to the true-valued leaf node.

(Supplementary note 2) The inconsistency detection device according to claim 1, further comprising: an extraction means which extracts all paths from the decision graph from the root node to the true-valued leaf node; an assignment means which assigns path numbers to all of the extracted paths; a detection means which detects a path including an edge indicating a transition to a negation side of the observed event in the series of observed events decided to be inconsistent; an addition means which adds the path number of the detected path to each of the observed events; and a derivation means which derives a minimal set of coverings of all path numbers from the observed events to which path numbers are added.

(Supplementary note 3) The inconsistency detection device according to claim 1 or 2, wherein the determination means sets a label to the node for which no path to the true-valued leaf node exists at final transition destination in the decision graph after the deletion means deletes the edge, and determines that no path to the true-valued leaf node exists when the label is set to the root node.

(Supplementary note 4) The inconsistency detection device according to any one of claims 1 to 3, further comprising: a grounding operation means which performs grounding operation based on the Herbrand universe of the knowledge base; and a construction means which constructs the decision graph from a propositional formula generated by the grounding operation means.

(Supplementary note 5) The inconsistency detection device according to any one of claims 1 to 4, further comprising an output means which outputs the series of observed events decided to be inconsistent by the decision means.

(Supplementary note 6) An inconsistency detection method comprising: accepting input of a series of observed events including one or more observed events; deleting, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the accepted observed event; determining whether or not a path from a root node to a true-valued leaf node exists, in the decision graph after the deletion of the edge; and deciding that the series of observed events is inconsistent with respect to the knowledge base when determined that there is no path to the true-valued leaf node.

(Supplementary note 7) The inconsistency detection method according to claim 6, further comprising: extracting all paths from the decision graph from the root node to the true-valued leaf node; assigning path numbers to all of the extracted paths; detecting a path including an edge that indicate a transition to the side that negates each observed event in the series of observed events determined to be inconsistent; adding the path number of the detected path to each of the observed events; and deriving a minimal set of coverings of all path numbers from the observed events to which path numbers are added.

(Supplementary note 8) A computer-readable recording medium in which an inconsistency detection program is recorded, the inconsistency detection program causing a computer to execute: acceptance process of accepting input of a series of observed events including one or more observed events; deletion process of deleting, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the accepted observed event; determination process of determining whether or not a path from a root node to a true-valued leaf node exists, in the decision graph after the deletion of the edge; and decision process of deciding that the series of observed events is inconsistent with respect to the knowledge base when determined that there is no path to the true-valued leaf node.

(Supplementary note 9) The computer-readable recording medium according to Supplementary note 8, wherein the inconsistency detection program causing a computer to further execute: extraction process of extracting all paths from the decision graph from the root node to the true-valued leaf node; assignment process of assigning path numbers to all of the extracted paths; detection process of detecting a path including an edge that indicate a transition to the side that negates each observed event in the series of observed events determined to be inconsistent; addition process of adding the path number of the detected path to each of the observed events; and derivation process of deriving a minimal set of coverings of all path numbers from the observed events to which path numbers are added.

(Supplementary note 10) An inconsistency detection program causing a computer to execute: acceptance process of accepting input of a series of observed events including one or more observed events; deletion process of deleting, in a decision graph for determining a boolean value of the observed event based on a knowledge base in which the observed event is a node and transition relationship of each of the observed events is an edge, the edge indicating a transition to a negation side of the observed event from among the edges connected to the node corresponding to the accepted observed event; determination process of determining whether or not a path from a root node to a true-valued leaf node exists, in the decision graph after the deletion of the edge; and decision process of deciding that the series of observed events is inconsistent with respect to the knowledge base when determined that there is no path to the true-valued leaf node.

(Supplementary note 11) The inconsistency detection program according to Supplementary note 10, wherein the inconsistency detection program causing a computer to further execute: extraction process of extracting all paths from the decision graph from the root node to the true-valued leaf node; assignment process of assigning path numbers to all of the extracted paths; detection process of detecting a path including an edge that indicate a transition to the side that negates each observed event in the series of observed events determined to be inconsistent; addition process of adding the path number of the detected path to each of the observed events; and derivation process of deriving a minimal set of coverings of all path numbers from the observed events to which path numbers are added.

INDUSTRIAL APPLICABILITY

The invention is suitable for an inconsistency detection device for detecting inconsistencies in deriving a hypothesis by applying reasoning knowledge to observed events.

REFERENCE SIGNS LIST

1, 2, 3, 4 Inconsistency detection device
11, 21 Construction unit
12 Acceptance unit
13 Deletion unit
14, 24 Determination unit
15 Repetition control unit
16 Decision unit
17 Grounding operation unit

18 Output unit
30 Minimal inconsistency set detection device
31 Decision graph acquisition unit
32 Observed event acquisition unit
33 Minimal set covering derivation unit
331 Extraction unit
332 Assignment unit
333 Detection unit
334 Addition unit
335 Derivation unit
34 Output unit

What is claimed is:

1. An inconsistency detection device comprising:
a memory storing instructions; and
one or more processors configured to execute the instructions to:
construct a decision graph as a zero-suppressed binary decision diagram (ZDD) by representing results of case classification of values of logical expressions for variables based on a knowledge base as a binary decision tree and contracting the binary decision tree,
wherein the decision graph comprises nodes corresponding to observed events and edges representing transition relationships between the nodes, and
wherein the edges include a True edge corresponding to a transition in a case where a node is true and a False edge corresponding to a transition in a case where a node is false;
for each accepted observed event, delete an edge, from among the edges, that transitions to a negation side of an accepted observed event, wherein the deleted edge is one of the True edge or the False edge;
after the deleting, set a False label to a node for which no path to a true-valued leaf node exists at a final transition destination, and determine that no path to the true-valued leaf node exists in a case where the False label is set to a root node;
extract all paths in the decision graph from the root node to the true-valued leaf node after the deleting;
assign a respective path number to each of the extracted paths;
detect, among the extracted paths, one or more paths that satisfy a predetermined criterion including a path that includes an edge indicating a transition to a negation side of an observed event;
add, to each of one or more observed events associated with each detected path, the path number assigned to the detected path;
derive a minimal set of coverings of all path numbers added to the observed events; and
decide that the series of observed events is inconsistent with respect to the knowledge base in a case where it is determined that no path to the true-valued leaf node exists.

2. The inconsistency detection device according to claim 1, wherein the one or more processors are configured to execute the instructions to set a label to the node for which no path to the true-valued leaf node exists at final transition destination in the decision graph after the deleting the edge, and determine that no path to the true-valued leaf node exists in a case where the label is set to the root node.

3. The inconsistency detection device according to claim 1, wherein the one or more processors are configured to execute the instructions to:
perform a grounding operation based on the Herbrand universe of the knowledge base; and
construct the decision graph from a generated propositional formula.

4. The inconsistency detection device according to claim 1, wherein the one or more processors are configured to execute the instructions to output the series of observed events decided to be inconsistent.

5. An inconsistency detection method comprising:
constructing a decision graph as a zero-suppressed binary decision diagram (ZDD) by representing results of case classification of values of logical expressions for variables based on a knowledge base as a binary decision tree and contracting the binary decision tree,
wherein the decision graph comprises nodes corresponding to observed events and edges representing transition relationships between the nodes, and
wherein the edges include a True edge corresponding to a transition in a case where a node is true and a False edge corresponding to a transition in a case where a node is false;
for each accepted observed event, deleting an edge, from among the edges, that transitions to a negation side of an accepted observed event, wherein the deleted edge is one of the True edge or the False edge;
after the deleting, setting a False label to a node for which no path to a true-valued leaf node exists at a final transition destination, and determining that no path to the true-valued leaf node exists in a case where the False label is set to a root node;
extracting all paths in the decision graph from the root node to the true-valued leaf node after the deleting;
assigning a respective path number to each of the extracted paths;
detecting, among the extracted paths, one or more paths that satisfy a predetermined criterion including a path that includes an edge indicating a transition to a negation side of an observed event;
adding, to each of one or more observed events associated with each detected path, the path number assigned to the detected path;
deriving a minimal set of coverings of all path numbers added to the observed events; and
deciding that the series of observed events is inconsistent with respect to the knowledge base in a case where it is determined that no path to the true-valued leaf node exists.

6. A non-transitory computer-readable recording medium storing an inconsistency detection program, which when executed by a processor, performs a method comprising:
constructing a decision graph as a zero-suppressed binary decision diagram (ZDD) by representing results of case classification of values of logical expressions for variables based on a knowledge base as a binary decision tree and contracting the binary decision tree,
wherein the decision graph comprises nodes corresponding to observed events and edges representing transition relationships between the nodes, and
wherein the edges include a True edge corresponding to a transition in a case where a node is true and a False edge corresponding to a transition in a case where a node is false;
for each accepted observed event, deleting an edge, from among the edges, that transitions to a negation side of an accepted observed event, wherein the deleted edge is one of the True edge or the False edge;
after the deleting, setting a False label to a node for which no path to a true-valued leaf node exists at a final transition destination, and determining that no path to the true-valued leaf node exists in a case where the False label is set to a root node;

extracting all paths in the decision graph from the root node to the true-valued leaf node after the deleting;

assigning a respective path number to each of the extracted paths;

detecting, among the extracted paths, one or more paths that satisfy a predetermined criterion including a path that includes an edge indicating a transition to a negation side of an observed event;

adding, to each of one or more observed events associated with each detected path, the path number assigned to the detected path;

deriving a minimal set of coverings of all path numbers added to the observed events; and deciding that the series of observed events is inconsistent with respect to the knowledge base in a case where it is determined that no path to the 1 true-valued leaf node exists.

* * * * *